United States Patent
Arakane

(10) Patent No.: US 11,951,752 B2
(45) Date of Patent: Apr. 9, 2024

(54) CONTROLLER, PRINTER, AND COMPUTER-READABLE STORAGE MEDIUM

(71) Applicant: BROTHER KOGYO KABUSHIKI KAISHA, Nagoya (JP)

(72) Inventor: Satoru Arakane, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 4 days.

(21) Appl. No.: 17/532,054

(22) Filed: Nov. 22, 2021

(65) Prior Publication Data

US 2022/0169035 A1 Jun. 2, 2022

(30) Foreign Application Priority Data

Nov. 27, 2020 (JP) .................. 2020-197261

(51) Int. Cl.
*B41J 2/21* (2006.01)
*G06K 15/10* (2006.01)

(52) U.S. Cl.
CPC .......... *B41J 2/2132* (2013.01); *B41J 2/2146* (2013.01); *G06K 15/107* (2013.01)

(58) Field of Classification Search
CPC ...... B41J 2/2132; B41J 2/2121; B41J 2/2128; B41J 2/04581; G06K 15/107
See application file for complete search history.

(56) References Cited

U.S. PATENT DOCUMENTS

| | | | |
|---|---|---|---|
| 2010/0182366 A1* | 7/2010 | Takagi | B41J 2/2132 347/14 |
| 2018/0213125 A1 | 7/2018 | Takeuchi et al. | |
| 2020/0282743 A1 | 9/2020 | Maehira et al. | |

FOREIGN PATENT DOCUMENTS

| | | |
|---|---|---|
| JP | 2018-118382 A | 8/2018 |
| JP | 2020-147039 A | 9/2020 |

* cited by examiner

*Primary Examiner* — Julian D Huffman
(74) *Attorney, Agent, or Firm* — Scully, Scott, Murphy & Presser, PC

(57) ABSTRACT

A controller includes a print controller configured to cause the print execution engine to convey the print medium in a conveying direction and execute a plurality of partial printings. The print controller causes the print execution engine to execute first and second partial printings. On a print medium, first and second target ranges on which printing is to be performed by the first and second partial printings, respectively, form an overlapping range. The first and second target ranges include first and second non-overlapping ranges, respectively, that do not overlap the second and first target ranges, respectively. The print controller generates print data based on non-overlapping range data and overlapping range data. The generating the print data includes increasing a density of at least a portion of the image to be printed in the overlapping range as compared with a density of the images to be printed in the non-overlapping ranges.

9 Claims, 21 Drawing Sheets

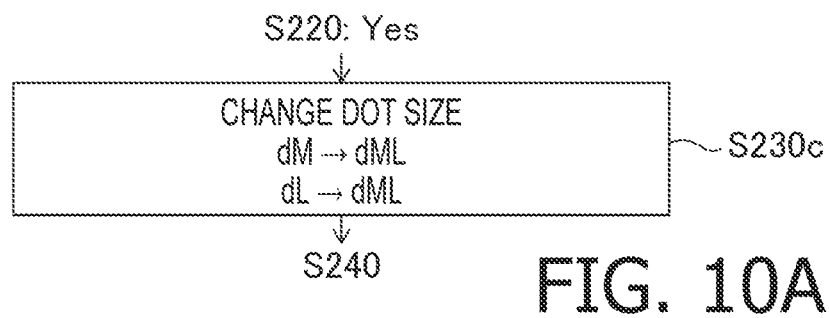
FIG. 10A
NON-OVERLAPPING RANGE
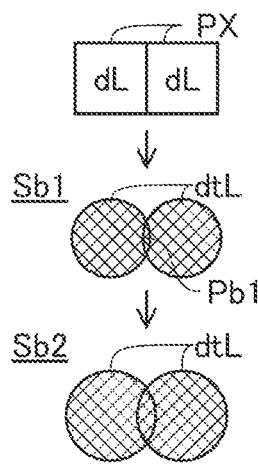
FIG. 10B
OVERLAPPING RANGE
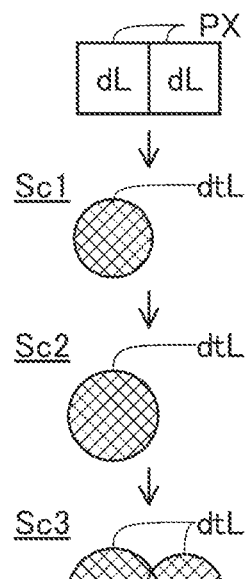
FIG. 10C
OVERLAPPING RANGE
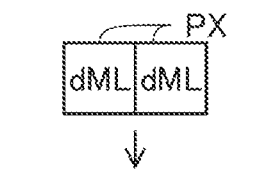
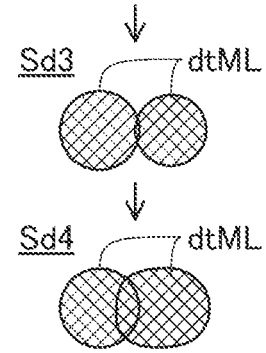
FIG. 10D

| DOT SIZE | WAVEFORM DATA FIRE | | SELECTION DATA SIN (TONE DATA) |
|---|---|---|---|
| | FIRST DRIVE SIGNAL GROUP | SECOND DRIVE SIGNAL GROUP | |
| ZERO | dN (0pl) 000 | dN (0pl) 000 | 00 |
| SMALL | dS (5pl) 001 | dS (5pl) 001 | 01 |
| MEDIUM | dML (15pl) 010 | dM (10pl) 101 | 10 |
| LARGE | dL (30pl) 011 | dL (30pl) 011 | 11 |

FIG. 18C

CONTROLLER, PRINTER, AND COMPUTER-READABLE STORAGE MEDIUM

CROSS REFERENCE TO RELATED APPLICATIONS

This application claims priority under 35 U.S.C. § 119 from Japanese Patent Application No. 2020-197261 filed on Nov. 27, 2020. The entire subject matter of the application is incorporated herein by reference.

BACKGROUND

Aspects of the present disclosure relate to a technique for controlling a print execution engine.

There has been known an inkjet printer including a head having nozzles. When printing an image by printing a plurality of bands by causing the head to make a plurality of paths, the printer prints areas around boundaries between bands by two paths and prints the other areas by one path. When executing printing, a color conversion process for converting RGB data into data of a CMYK color space is executed. A table different from a look-up table of the color conversion process for the areas on which printing is to be performed by one path is used in the color conversion process for the areas on which printing is to be performed by two paths. Color unevenness occurring between the areas around boundaries between bands and the other areas can be thereby reduced.

SUMMARY

An image may be printed by repeating a partial printing such as the path for printing a portion of the image. In the areas printed by the two partial printings, since the plurality of dots to be printed are shared by the two partial printings, the total number of dots to be formed by one partial printing decreases. In this case, actual volumes of ink droplets ejected from the nozzles by one partial printing may vary. For example, the volumes of ink droplets may become small As a result, an image printed by two partial printings may become paler than an image printed by one partial printing.

According to aspects of the present disclosure, there is provided a controller configured to control a print execution engine including a print head having a plurality of nozzles configured to eject ink, a head driver configured to cause the print head to eject ink to form dots on a print medium, and a conveyer configured to convey the print medium with respect to the print head in a conveying direction. The controller includes a print controller configured to cause the print execution engine to print a print image by causing the print execution engine to, using target image data, convey the print medium with the conveyer and execute a plurality of partial printings in which the print head forms the dots. The print controller is configured to cause the print execution engine to execute a first partial printing, and cause the print execution engine to execute a second partial printing. On the print medium, defined are a first target range and a second target range, the first target range being a print target range in the conveying direction on which printing is to be performed by the first partial printing and the second target range being a print target range in the conveying direction on which printing is to be performed by the second partial printing form an overlapping range in which edge portions of the first target range and the second target range overlap each other. The first target range includes a first non-overlapping range that does not overlap the second target range, and the second target range includes a second non-overlapping range that does not overlap the first target range. The print controller is configured to execute generating print data based on pieces of non-overlapping range data of the target image data corresponding to the first and second non-overlapping ranges and on overlapping range data of the target image data corresponding to the overlapping range, and outputting the print data to cause the print execution engine to print images in the first and second non-overlapping range and the overlapping range. The generating the print data includes increasing a density of at least a portion of the image to be printed in the overlapping range as compared with a density of the images to be printed in the first and second non-overlapping ranges.

According to aspects of the present disclosure, there is further provided a printer including a print execution engine and a controller. The print execution engine includes a print head having a plurality of nozzles for ejecting ink, a head driver configured to cause the print head to eject ink to form dots on a print medium, and a conveyer configured to convey the print medium with respect to the print head in a conveying direction. The controller is configured to control the print execution engine. The controller includes a print controller configured to cause the print execution engine to print a print image by causing the print execution engine to, using target image data, convey the print medium with the conveyer and execute a plurality of partial printings in which the print head forms the dots. The print controller is configured to cause the print execution engine to execute a first partial printing, and cause the print execution engine to execute a second partial printing. On the print medium, defined are a first target range and a second target range, the first target range being a print target range in the conveying direction on which printing is to be performed by the first partial printing and the second target range being a print target range in the conveying direction on which printing is to be performed by the second partial printing form an overlapping range in which edge portions of the first target range and the second target range overlap each other. The first target range includes a first non-overlapping range that does not overlap the second target range. The second target range includes a second non-overlapping range that does not overlap the first target range. The print controller is configured to execute generating print data based on pieces of non-overlapping range data of the target image data corresponding to the first and second non-overlapping ranges and on overlapping range data of the target image data corresponding to the overlapping range, and output the print data to cause the print execution engine to print images in the first and second non-overlapping ranges and an image in the overlapping range. The generating the print data includes increasing a density of at least a portion of the image to be printed in the overlapping range as compared with a density of the images to be printed in the first and second non-overlapping ranges.

According to aspects of the present disclosure, there is further provided a non-transitory computer-readable storage medium storing computer-readable instructions configured to, when executed by a controller configured to control a print execution engine including a print head having a plurality of nozzles configured to eject ink, a head driver configured to cause the print head to eject ink to form dots on a print medium, and a conveyer configured to convey the print medium with respect to the print head in a conveying direction, the controller including a print controller configured to cause the print execution engine to print a print image by causing the print execution engine to, using target image data, convey the print medium with the conveyer and execute a plurality of partial printings in which the print head forms the dots, cause the print controller to cause the print execution engine to execute a first partial printing, and cause the print execution engine to execute a second partial printing. On the print medium, defined are a first target range and a second target range, the first target range being a print target range in the conveying direction on which printing is to be performed by the first partial printing and the second target range being a print target range in the conveying direction on which printing is to be performed by the second partial printing form an overlapping range in which edge portions of the first target range and the second target range overlap each other. The first target range includes a first non-overlapping range that does not overlap the second target range, and the second target range includes a second non-overlapping range that does not overlap the first target range. The print controller is caused to execute generating print data based on pieces of non-overlapping range data of the target image data corresponding to the first and second non-overlapping ranges and on overlapping range data of the target image data corresponding to the overlapping range, and output the print data to cause the print execution engine to print images in the first and second non-overlapping ranges and an image in the overlapping range. The generating the print data includes increasing a density of at least a portion of the image to be printed in the overlapping range as compared with a density of the images to be printed in the first and second non-overlapping ranges.

BRIEF DESCRIPTION OF THE DRAWINGS

FIG. 10A is a flowchart of another example of the density adjustment process.

FIG. 10B is a schematic diagram showing an example of dots formed on a paper.

FIG. 10C is a schematic diagram showing an example of dots formed on the paper.

FIG. 10D is a schematic diagram showing an example of dots formed on the paper.

FIG. 18C is a table showing a relationship between dot sizes indicated by dot data, waveform data, the drive signal groups, and gradation data of selection data.

DETAILED DESCRIPTION

A. First Embodiment

Figure 1:
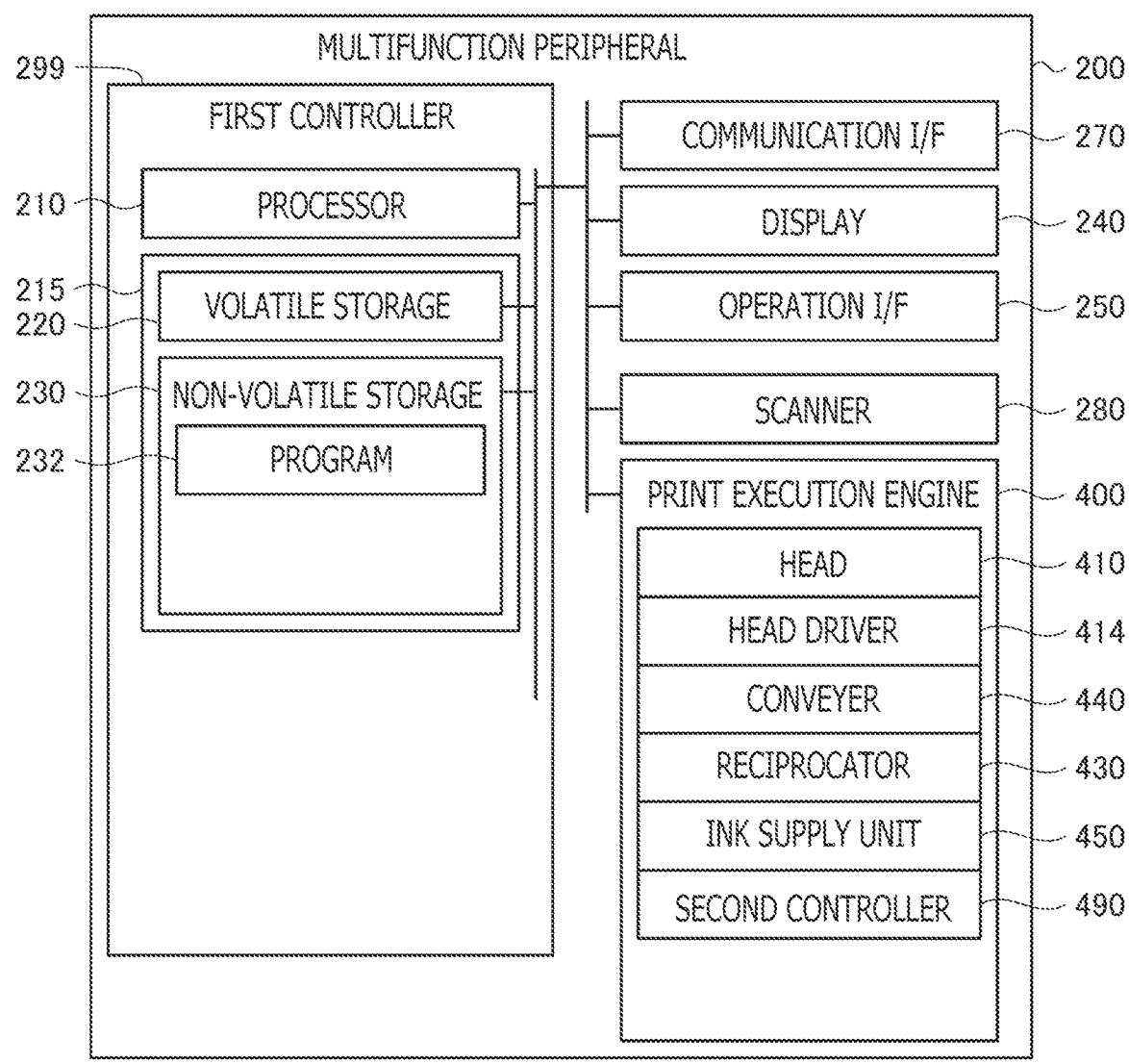
FIG. 1 illustrates a multifunction peripheral as an example of a printer.

FIG. 1 illustrates a multifunction peripheral 200 according to an embodiment of the present disclosure. The multifunction peripheral 200 includes a first controller 299, a display 240, an operation interface 250, a communication interface 270, a scanner 280, and a print execution engine 400. The first controller 299 includes a processor 210 and a storage 215. These elements are connected to each other via a bus. The storage 215 includes a volatile storage 220 and a nonvolatile storage 230.

The processor 210 is a device configured to perform data processing, and is, for example, a CPU. The volatile storage 220 is, for example, a DRAM, and the nonvolatile storage 230 is, for example, a flash memory.

The nonvolatile storage 230 stores a program 232. The processor 210 realizes various functions by executing the program 232. Details will be described later. The processor 210 temporarily stores various intermediate data used for executing the program 232 in a storage (for example, either of the volatile storage 220 and the nonvolatile storage 230). In the present embodiment, the program 232 is stored in advance in the nonvolatile storage 230 as a firmware by the manufacturer of the multifunction peripheral 200.

The display 240 is a device configured to display an image, such as a liquid crystal display or an organic EL display. The operation interface 250 is a device configured to receive operations by a user, such as a touch panel overlayed on the display 240, buttons, and levers. The user can input various instructions to the multifunction peripheral 200 by operating the operation interface 250. The communication interface 270 is an interface for communicating with other devices, such as a USB interface, a wired LAN interface, and a wireless interface of IEEE802. 11).

The scanner 280 is a reading device configured to optically read an object such as a document using a photoelectric conversion element such as a CCD or a CMOS. The scanner 280 generates read data such as RGB bitmap data representing a read image.

The print execution engine 400 is a device configured to print an image on a paper. In the present embodiment, the print execution engine 400 includes a print head 410 (also simply referred to as a head 410), a head driver 414, a conveyer 440, a reciprocator 430, an ink supply unit 450, and a second controller 490 configured to control these elements 410, 414, 430, 440, and 450. In the present embodiment, the print execution engine 400 is an inkjet printing engine that uses inks of cyan C, magenta M, yellow Y, and black K. The second controller 490 includes, for example, an electric circuit configured to drive elements of the print execution engine 400 such as motors and the head driver 414, and a computer.

The first controller 299 is configured to generate print data using image data and cause the print execution engine 400 to print an image using the generated print data. In order to generate print data, the first controller 299 can use the read data and image data stored in an external storage (e.g., a memory card connected to the communication interface 270). The first controller 299 can cause the print execution engine 400 to print an image using print data supplied from another external device connected to the multifunction peripheral 200.

Figure 2:
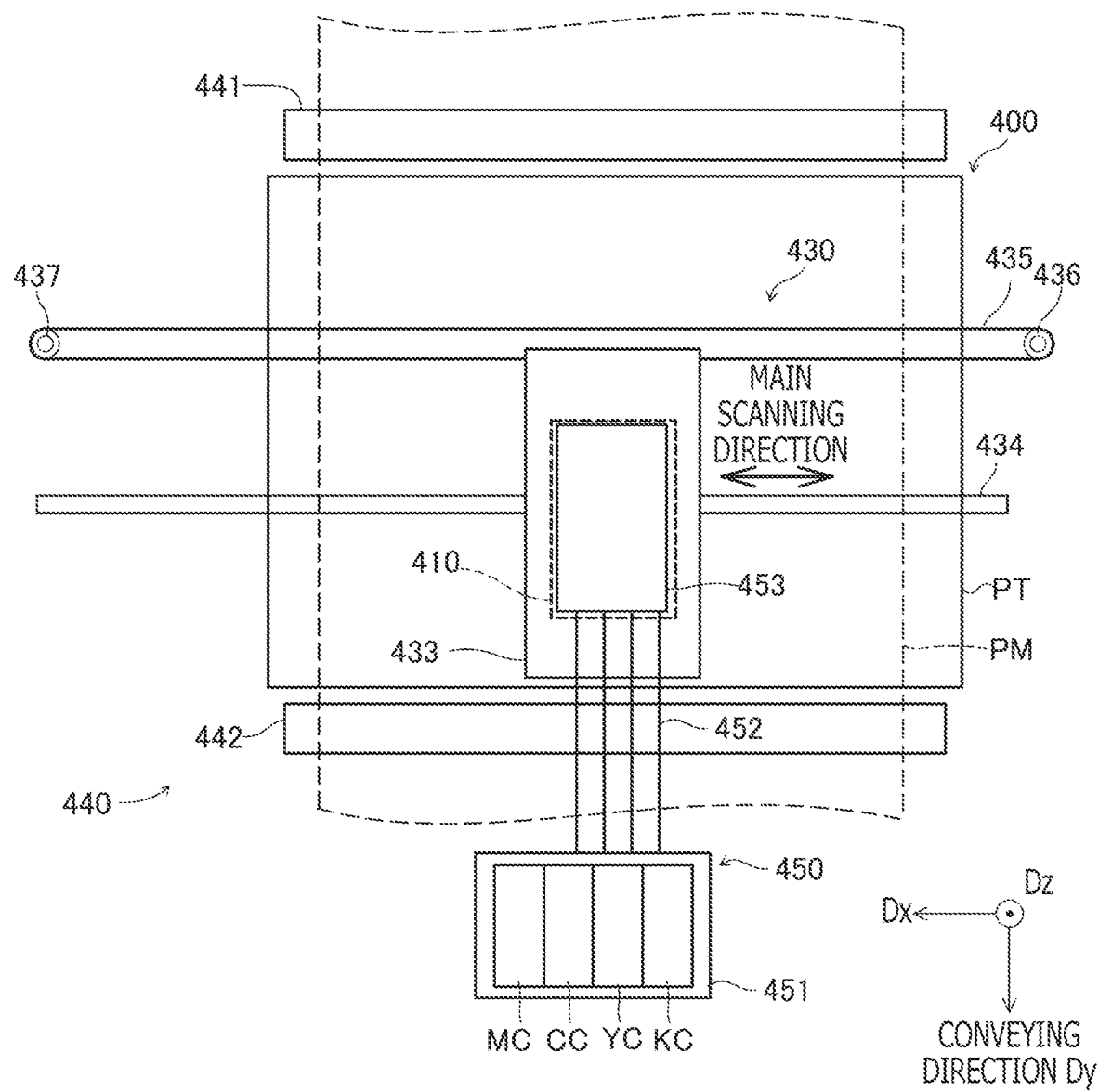
FIG. 2 is a schematic diagram of a print execution engine.

FIG. 2 is a schematic diagram of the print execution engine 400. The reciprocator 430 includes a carriage 433, a slide shaft 434, a belt 435, and a plurality of pulleys 436 and 437. The head 410 is mounted on the carriage 433. The slide shaft 434 holds the carriage 433 so that the carriage 433 reciprocate along a main scanning direction (a direction parallel to the Dx direction). The belt 435 is wound around the pulleys 436 and 437, and a part thereof is fixed to the carriage 433. The pulley 436 is rotated by driving force of a conventionally-known main scanning motor. When the main scanning motor rotates the pulley 436, the carriage 433 moves along the slide shaft 434. As a result, main scanning of moving the head 410 along the main scanning direction with respect to a paper PM is realized.

The conveyer 440 conveys the paper PM in the Dy direction perpendicular to the main scanning direction with respect to the head 410 while holding the paper PM (i.e., the paper PM moves in the Dy direction). Hereinafter, the Dy direction is also referred to as a conveying direction Dy. The Dy direction is also referred to as a +Dy direction, and a direction opposite to the +Dy direction is also referred to as a −Dy direction. The same applies to the +Dx direction and the −Dx direction. The printing of an image on the paper PM proceeds from the +Dy direction side to the −Dy direction side on the paper PM.

The conveyer 440 is disposed at a position facing a surface of the head 410 for discharging ink, and includes a platen PT configured to support the paper PM, a first roller 441 and a second roller 442 configured to hold the paper PM placed on the platen PT, and a conventionally-known conveying motor configured to drive the rollers 441 and 442. The first roller 441 is disposed on the −Dy direction side of the head 410, and the second roller 442 is disposed on the +Dy direction side of the head 410. The paper PM is fed from a conventionally-known sheet tray to the conveyer 440 by a conventionally-known sheet feed roller. The paper PM fed to the conveyer 440 is nipped between the first roller 441 and a conventionally-known driven roller paired with the first roller 441, and is conveyed in a sub-scanning direction Dy by these rollers. The conveyed paper PM is nipped between the second roller 442 and a conventionally-known driven roller paired with the second roller 442, and is conveyed in the sub-scanning direction Dy by these rollers. The conveyer 440 conveys the paper PM in the conveying direction Dy by driving the rollers 441 and 442 with the driving force of the conveying motor. Hereinafter, the process of conveying the paper PM in the conveying direction Dy is also referred to as a sub-scanning or a conveying process. The conveying direction Dy is also referred to as a sub-scanning direction Dy. A Dz direction in the drawings is a direction perpendicular to the two directions Dx and Dy and directed from the platen PT toward the head 410.

The ink supply unit 450 supplies ink to the head 410. The ink supply unit 450 includes a cartridge mount 451, a tube 452, and a buffer tank 453. A plurality of ink cartridges KC, YC, CC, and MC are detachably mounted on the cartridge mount 451. The buffer tank 453 is disposed above the head 410 in the carriage 433, and temporarily stores the inks of cyan C, magenta M, yellow Y, and black K to be supplied to the head 410 separately. The tube 452 is a flexible tube serving as an ink flow path connecting between the cartridge mount 451 and the buffer tank 453. The ink in each ink cartridge is supplied to the head 410 via the cartridge mount 451, the tube 452, and the buffer tank 453.

Figure 3A:
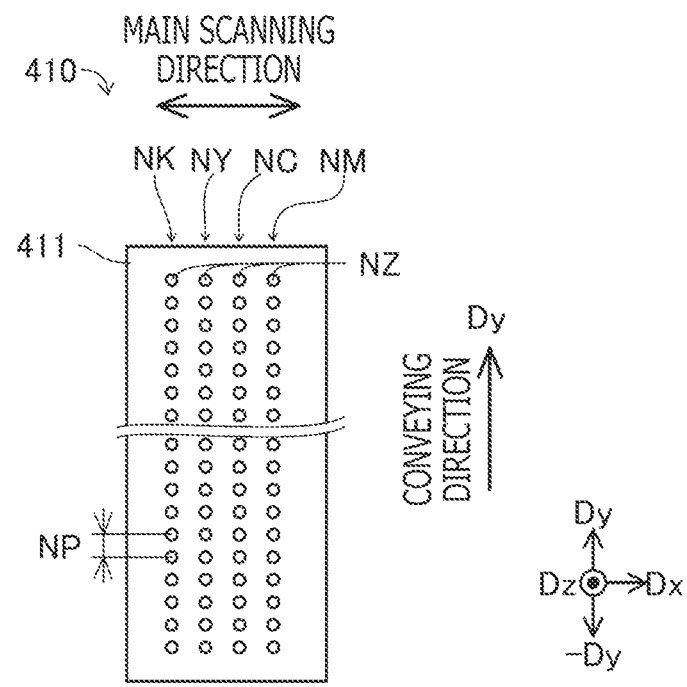
FIG. 3A is a perspective view showing a configuration of a head viewed in a −Dz direction.

FIG. 3A is a perspective view showing a configuration of the head 410 viewed in the −Dz direction. In the drawing, unlike FIG. 2, the sub-scanning direction Dy is directed upward. Nozzle groups NK, NY, NC, and NM configured to eject the inks of K, Y, C, and M described above, respectively, are formed on a nozzle forming surface 411 being a surface on the −Dz direction side of the head 410. Each nozzle group includes a plurality of nozzles NZ. Positions of the plurality of nozzles NZ in one nozzle group in the sub-scanning direction Dy are different from each other. The positions of the nozzle groups NK, NY, NC, and NM in the main scanning direction are different from each other. In the example illustrated in FIG. 3, the nozzle groups NK, NY, NC, and NM are arranged in this order in the +Dx direction.

In the present embodiment, the positions of the plurality of nozzles NZ in one nozzle group in the sub-scanning direction Dy are at constant intervals of a nozzle pitch NP. The nozzle pitch NP is a difference in position in the sub-scanning direction Dy between two nozzles NZ adjacent to each other in the sub-scanning direction Dy. In the present embodiment, positions of the nozzles NZ in the sub-scanning direction Dy in the four nozzle groups NK, NY, NC, and NM are the same.

Figure 3B:
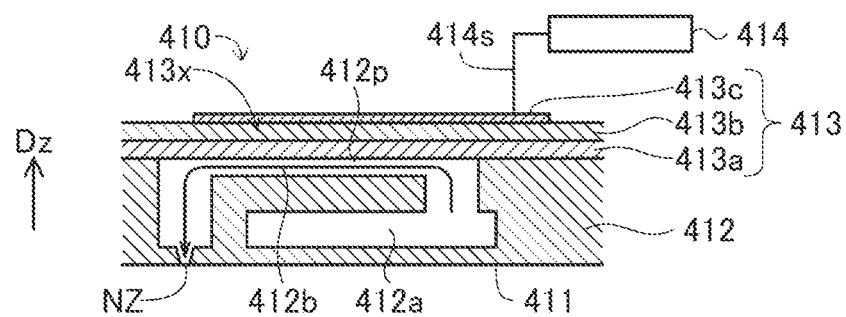
FIG. 3B is a schematic diagram of a portion of a cross-section of the head along a plane parallel to a Dz direction and a Dy direction.

FIG. 3B is a schematic diagram of a portion of a cross-section of the head 410 along a plane parallel to the Dz direction and the Dy direction. In the drawing, a partial cross section including a flow path for one nozzle NZ is shown. The head 410 includes a flow path unit 412 and an actuator unit 413.

A lower surface of the flow path unit 412 forms the nozzle forming surface 411. A common flow path 412a and an individual flow path 412b are formed inside the flow path unit 412. The common flow path 412a is a flow path communicating with the buffer tank 453 (FIG. 2), and is a flow path common to the plurality of nozzles NZ for the same ink. The individual flow path 412b is a flow path from an outlet of the common flow path 412a to the nozzle NZ via a pressurizing chamber 412p, and is provided for each nozzle NZ.

The actuator unit 413 includes a metal-made diaphragm 413a that covers a plurality of pressurizing chambers 412p upper surfaces, a piezoelectric layer 413b disposed on an upper surface of the diaphragm 413a, and a plurality of individual electrodes 413c disposed on the upper surface of the piezoelectric layer 413b. The plurality of individual electrodes 413c are disposed so as to face the plurality of pressurizing chambers 412p, respectively.

The diaphragm 413a and the plurality of individual electrodes 413c are electrically connected to the head driver 414. The head driver 414 keeps a potential of the diaphragm 413a at the ground potential and changes potentials of the individual electrodes 413c.

Figure 3C:
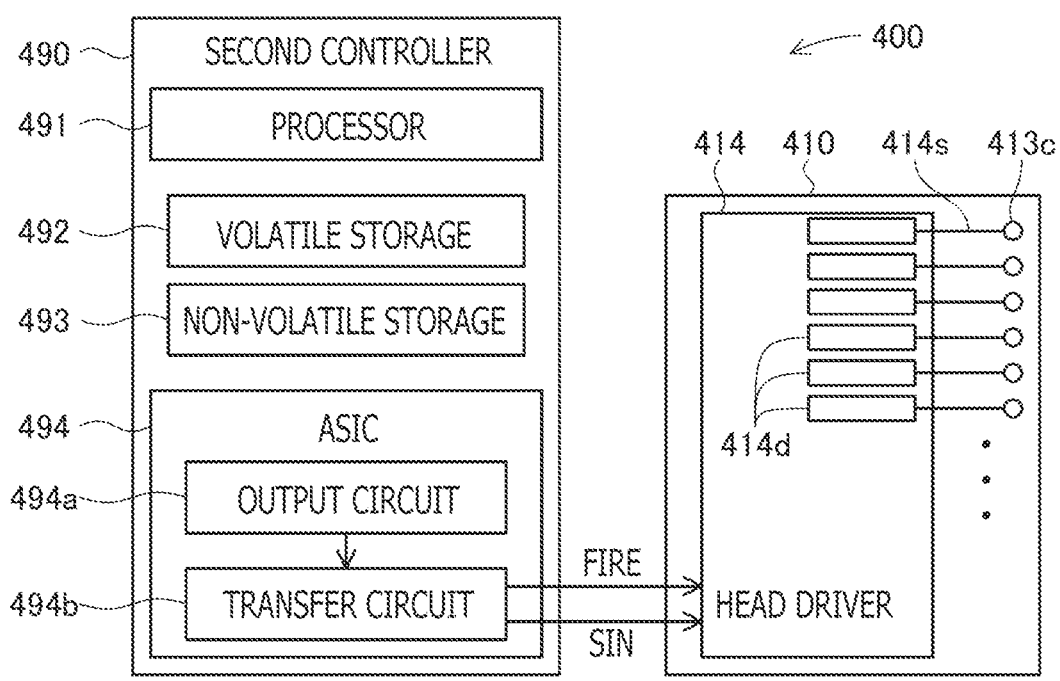
FIG. 3C illustrates a second controller, the head, and a head driver.

FIG. 3C illustrates the second controller 490, the head 410, and the head driver 414 of the print execution engine 400 (FIG. 1). The head driver 414 is mounted on the head 410. The head driver 414 includes a plurality of drive circuits 414d corresponding to the plurality of individual electrodes 413c. One drive circuit 414d is electrically connected to one individual electrode 413c via a signal line 414s. Each drive circuit 414d generates a drive signal based on control data (specifically, waveform data FIRE and selection data SIN which will be described later) from the second controller 490, and supplies the drive signal to the individual electrode 413c via the signal line 414s. Thus, the potential of the electrode 413c changes between the ground potential (0V) and a particular drive potential (VDD). The drive circuit 414d includes an electric circuit (for example, a switching circuit) that changes the potential.

Among the diaphragm 413a and the piezoelectric layer 413b, an actuator 413x, which is a portion sandwiched between the electrode 413c and the pressurizing chamber 412p, deforms in accordance with a change in the potential of the individual electrode 413c. Due to the deformation of the actuator 413x, a volume of the pressurizing chamber 412p changes, the ink in the pressurizing chamber 412p is pressurized, and an ink droplet is ejected from the nozzle NZ. The actuator 413x is provided to each individual electrode 413c (i.e., for each nozzle NZ). The plurality of actuators 413x can be independently deformed according to the potentials supplied to the individual electrodes 413c.

The second controller 490 includes a processor 491, a volatile storage 492, a nonvolatile storage 493, and an application specific integrated circuit (ASIC) 494. The nonvolatile storage 493 stores a not-shown program. The processor 491 supplies an instruction for printing to the ASIC 494 based on data received from the first controller 299 by executing the program. The ASIC 494 drives the head driver 414, the main scanning motor, and the conveying motor in accordance with instructions from the processor 491. As a result, a conveying process and partial printing, which will be described later, are alternately performed, and an image is printed on the paper PM. The conveying process is a process of conveying the paper PM with the conveyer 440. The partial printing is a process of forming dots on the paper PM by ejecting ink droplets from the nozzles NZ while moving the head 410 with the reciprocator 430.

The ASIC 494 includes an output circuit 494a and a transfer circuit 494b. The output circuit 494a generates waveform data FIRE and selection data SIN which will be described later. The output circuit 494a outputs the data FIRE and the data SIN to the transfer circuit 494b every recording cycle T. The recording cycle T is a time required for the head 410 to move with respect to the paper PM by a distance corresponding to one pixel on the paper PM. The aforementioned one pixel is a pixel represented by a resolution for printing (also referred to as a print pixel). A dot is formed for each print pixel.

The waveform data FIRE is serial data obtained by serializing four pieces of drive waveform data respectively corresponding to four dot sizes, namely, "Zero dN (no ejection)," "Small dS," "Medium dM" and "Large dL." The size of the dot correlates with a volume of an ink droplet. For example, "Zero" indicates 0 pl (picolitre), "Small" indicates 5 pl, "Medium" indicates 10 pl, and "Large" indicates 30 pl.

The selection data SIN is serial data including gradation data for selecting one of the four pieces of driving waveform data. The output circuit 494a outputs the selection data SIN including the gradation data of each of the plurality of actuators 413x to the transfer circuit 494b every recording cycle T.

The transfer circuit 494b transfers the data FIRE and the data SIN received from the output circuit 494a to the head driver 414. The head driver 414 supplies a drive signal to the individual electrode 413c via the signal line 414s for each nozzle NZ every recording cycle T in accordance with the data FIRE and the data SIN from the transfer circuit 494b. Each of the plurality of nozzles NZ ejects ink droplets in accordance with a corresponding drive signal.

A2. Outline of Printing

Figure 4:
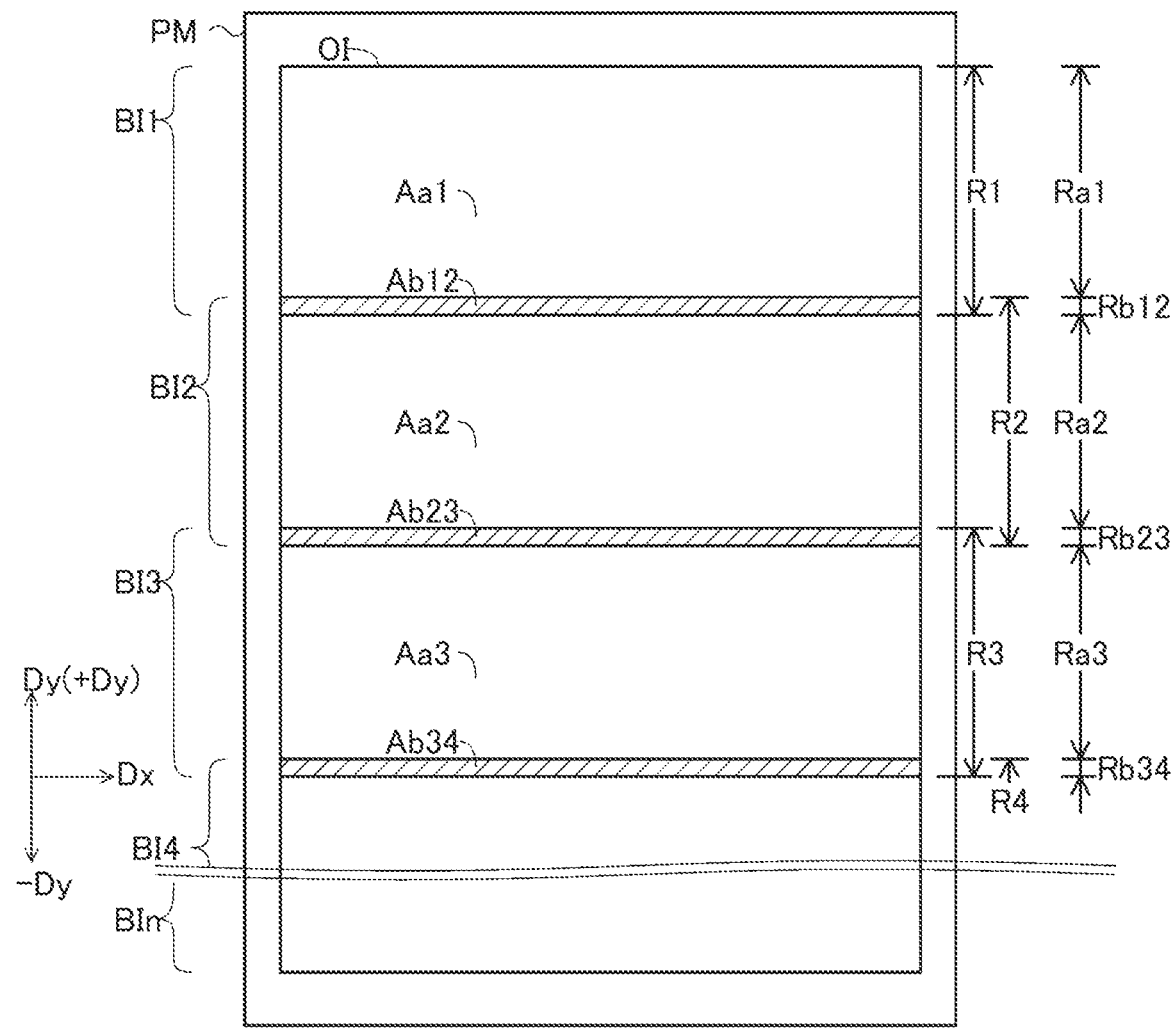
FIG. 4 illustrates an outline of printing by the print execution engine.

FIG. 4 illustrates an outline of printing by the print execution engine 400. In the drawing, the paper PM and a target image OI which is an image to be printed on the paper PM are shown. The target image OI includes a plurality of band images BI1 to BIn arranged in the −Dy direction (more generally, in the sub-scanning direction Dy) from an end on the +Dy direction side of the target image OI. Each of the band images BI1 to BIn is printed in one partial printing. Each of the band images BI1 to BIn has a rectangular shape extending in the main scanning direction (in the illustrated example, a direction parallel to the direction Dx).

The plurality of band images is sequentially printed one by one in the −Dy direction from the band image at an end on the +Dy direction side of the target image OI. Each of the partial printing and the conveying process after the partial printing is executed a plurality of times. In each partial printing, the head 410 moves in one of the main scanning directions (i.e., the +Dx direction or the −Dx direction). It is noted that the partial printing in the +Dx direction and the partial printing in the −Dx direction may be alternately performed. Such printing is also referred to as a bidirectional printing. Alternatively, the moving direction of the head 410 in the partial printing may be one direction that is set in advance.

Ranges R1 to R4 in the drawing are ranges of the band images BI1 to BI4 in the sub-scanning direction Dy, respectively. The range of the band image in the sub-scanning direction Dy is a print target range of a partial printing associated with the band image. Hereinafter, one partial printing is also referred to as a "path process" or simply "path." The print target range is also simply referred to as a target range. In the present embodiment, a width of each print target range in the sub-scanning direction Dy is set in advance. The width of one print target range is set to, for example, a width of a range in which dots can be formed by one partial printing (also referred to as a printable width). Alternatively, the width of one print target range may be smaller than the printable width.

In the example shown in FIG. 4, edge portions of two adjacent print target ranges overlap each other. For example, the edge portion on the −Dy direction side of the first print target range R1 and the edge portion on the +Dy direction side of the second print target range R2 overlap each other. The same applies to other combinations of two adjacent print target ranges.

FIG. 4 shows overlapping ranges Rb12, Rb23 and Rb34. The overlapping ranges Rb12, Rb23 and Rb34 are ranges in which two print target ranges overlap each other. Two numbers following the character "Rb" in the symbol of the overlapping range indicate the numbers of two print target ranges forming the overlapping range. For example, the overlapping range Rb23 is formed by the second print target range R2 and the third print target range R3.

FIG. 4 illustrates non-overlapping ranges Ra1, Ra2 and Ra3. The non-overlapping ranges Ra1, Ra2 and Ra3 are ranges included in one print target range only. A number following the character "Ra" in the symbol of the non-overlapping range indicates a serial number of one print target range forming the non-overlapping range. For example, the non-overlapping range Ra2 is formed by the second print target range R2.

One print target range may include the overlapping range that overlaps another print target range and the non-overlapping range that does not overlap another print target range. Areas Aa1, Aa2 and Aa3 in the drawing are areas included in the non-overlapping ranges Ra1, Ra2, and Ra3 in an area of the target image OI, respectively. Hereinafter, in the area of the target image OI, an area included in the non-overlapping range is also referred to as a non-overlapping area. The non-overlapping area has a rectangular shape extending in the main scanning direction (in the direction parallel to the Dx direction). Areas Ab12, Ab23, and Ab34 in the drawing are areas included in the overlapping ranges Rb12, Rb23, and Rb34 in the area of the target image OI. Hereinafter, in the area of the target image OI, an area included in the overlapping range is also referred to as an overlapping area. The overlapping area has a rectangular shape extending in the main scanning direction. In the present embodiment, a width of the overlapping range in the sub-scanning direction Dy is set in advance (the width may be, for example, 1 pixel or more and 20 pixels or less).

A plurality of pixels (and thus a plurality of dots) included in the overlapping range (for example, the overlapping ranges Rb12, Rb23 and Rb34) are distributed to two band images. That is, when printing a band image on the +Dy direction side, dots may be printed on some of the plurality of pixels within the overlapping range. When printing a band image on the -Dy direction side, dots may be printed on the remaining plurality of pixels among the plurality of pixels within the overlapping range. Therefore, it is possible to suppress defects on printed colors (e.g., unevenness in depth) at a boundary between the band image on the +Dy direction side and the band image on the -Dy direction side (i.e., the overlapping ranges).

Figure 5:
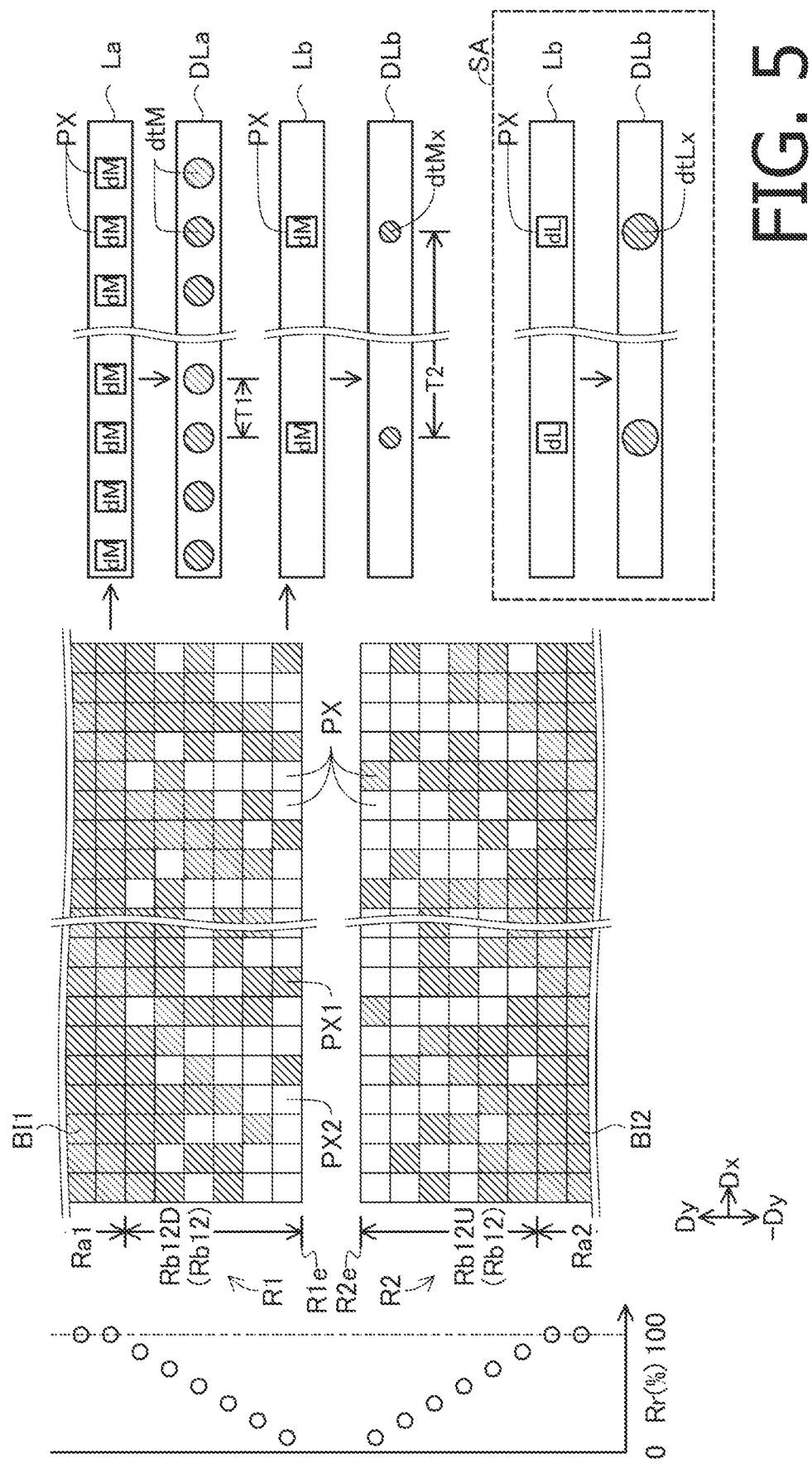
FIG. 5 illustrates dot formation in an overlapping range.

FIG. 5 illustrates dot formation in the overlapping range. In a central portion of the drawing, a plurality of print pixels PX of an edge portion on the -Dy direction side of the first print target range R1 and an edge portion on the +Dy direction side of the second print target range R2 are shown (the print pixels PX are also simply referred to as pixels PX). A range Rb 12D at the end of the first print target range R1 and a range Rb12U at the end of the second print target range R2 are ranges included in the same overlapping range Rb12. In the drawing, these ranges Rb12D and Rb12U are shown separated from each other. Hereinafter, the range Rb12D of the first print target range R1 is also referred to as a downstream overlapping range Rb12D, and the range Rb12U of the second print target range R2 is also referred to as an upstream overlapping range Rb12U.

Hatched pixels PX1 in FIG. 5 indicate pixels in which dot formation is permitted (hereinafter referred to as permitted pixels PX1). Blank pixels PX2 indicate pixels excluded from candidates for dot formation (hereinafter referred to as excluded pixels PX2). The plurality of pixels PX in the downstream overlapping range Rb12D are classified into either the allowable pixels PX1 or the excluded pixels PX2. An arrangement pattern of the pixels PX1 and PX2 is set in advance. The arrangement patterns of the pixels PX1 and PX2 in the upstream overlapping range Rb12U are the same as patterns obtained by replacing the allowable pixels PX1 and the excluded pixels PX2 in the downstream overlapping range Rb12D. Dot formation of the plurality of pixels PX in the overlapping range Rb12 is thereby divided into printing of the first band image BI1 and printing of the second band image BI2.

In the left part of FIG. 5, a recording rate Rr for each pixel line extending in the main scanning direction (in the direction parallel to the Dx direction) is shown (the pixel line is also referred to as a raster line). The recording rate Rr is a ratio of the total number of the allowable pixels PX1 to the total number of the plurality of pixels PX on the pixel line. As shown in the drawing, in the overlapping ranges Rb12D and Rb12U of the print target ranges R1 and R2, the recording rate Rr decreases toward edges R1e and R2e of the print target ranges R1 and R2. Specifically, in the non-overlapping range Ra1 of the first print target range R1, the recording rate Rr is 100%. In the downstream overlapping range Rb12D, the recording rate Rr gradually decreases from 100% to 0% toward the upstream side (-Dy). In the upstream overlapping range Rb12U of the second print target range R2, the recording rate Rr gradually increases from 0% to 100% toward the upstream side (i.e., in the -Dy direction). In the non-overlapping range Ra2, the recording rate Rr is 100%. In the range from the non-overlapping range Ra1 on the downstream side (+Dy) to the non-overlapping range Rb12 on the upstream side (-Dy) via the overlapping range Ra2, the recording rate Rr of each of the two partial printings thereby gradually changes in the -Dy direction. Therefore, defects such as white streaks are suppressed in the overlapping range Rb12.

In the present embodiment, the nozzle pitch NP (FIG. 3A) is the same as the pitch of the print pixels in the conveying direction Dy. In one partial printing, each dot of a plurality of pixels on one pixel line is formed using the same nozzle NZ facing the pixel line.

The dot formation of the plurality of pixels PX in the overlapping range Rb12 has been described. The dot formation of the plurality of pixels PX in the other overlapping ranges are performed in the same manner.

An example of dot formation of two pixel lines La and Lb is shown on the right side of the drawing. The first pixel line La is a pixel line within the non-overlapping range Ra1, and the second pixel line Lb is a pixel line within the overlapping range Rb12. Hereinafter, it is assumed that the dot sizes of a plurality of pixels PX of each of the pixel lines La and Lb are the same, namely, "Medium dM."

The first pixel line La is included in the non-overlapping range Ra1. Therefore, each dot of the plurality of pixels PX of the first pixel line La is printed by one partial printing. In the drawing, a first line DLa on the paper PM, corresponding to the first pixel line La, is shown below the first pixel line La. A plurality of dots DtM formed by a partial printing for the first print target range R1 are shown on the first line DLa. The actual size of these dots DtM is an appropriate size for "Medium dM." In the drawing, a first interval time T1 is shown. The interval time is a time from the formation of one dot to the formation of the next dot. In other words, the interval time is a time the head 410 (FIG. 3A) takes to move. Therefore, the interval time gets longer as the distance between two dots on the paper PM gets longer.

The second pixel line Lb is included in the overlapping range Rb12. Therefore, each dot of the plurality of pixels of the second pixel line Lb is shared by two partial printings. In the drawing, a second line DLb on the paper PM, corresponding to the second pixel line Lb, is shown below the second pixel line Lb. In the second line DLb, dots DtMx formed by one preceding partial printing (that is, the partial printing for the first print target range R1) are shown. In the preceding one partial printing, the dots DtMx are formed only in some of the plurality of pixels on the second line DLb. Therefore, an interval time T2 in the second line DLb is longer than the interval time T1 in the first line DLa.

When the interval time changes, even if the drive signals supplied to the individual electrodes 413c (FIGS. 3B and 3C) are the same, the actual volumes of the ink droplets ejected from the nozzles NZ may change. When the interval time (for example, the first interval time T1) is short as in the first pixel line La, current ink droplets are discharged in a state in which a vibration of the actuator 413x due to discharge of previous ink droplets remains. A vibration obtained by combining the residual vibration and a vibration caused by the current drive signal (i.e., a combined wave of a pressure wave caused by the residual vibration and a pressure wave caused by the vibration caused by the current drive signal) may increase volumes of the ejected ink droplets, as compared with a case where there is no residual vibration. In the present embodiment, a printing process is constructed on the assumption that a volume of an ink droplet ejected by the vibration obtained by combining the residual vibration and the vibration by the current drive signal (i.e., the combined wave) is a volume suitable for a dot size such as Medium dM. When the interval time is long, energy of the vibration remaining in the actuator 413x is attenuated due to the elapse of a long time from the ejection of the previous ink droplets. As a result, actual volumes of the next ink droplets to be ejected may become small. An actual size of the dot DtMx of the second line DLb in the drawing is smaller than an actual size of the dot DtM of the first line DLa. Also, in a subsequent second partial printing (i.e., a partial printing for the second print target range R2), an actual size of the dot formed on a pixel line in the overlapping range Rb12 may become small.

Thus, a density of an image in the overlapping range may become lower than a density of an image in the non-overlapping range. By executing a process of increasing the density of the image in the overlapping range, a decrease in the density of the image in the overlapping range can be suppressed. For example, a second pixel line Lb is shown in a frame SA of FIG. 5. Unlike the second pixel line Lb described above, the dot sizes of the plurality of pixels PX are changed from "Medium dM" to "Large dL." In this case, dots dtLx larger than the dots DtMx on the second line DLb described above are formed on the second line DLb on the paper PM. Accordingly, the decrease in the density of the image in the overlapping range can be suppressed. The actual size of the dot dtLx is smaller than an actual size of a dot corresponding to "Large dL" for the non-overlapping range. Therefore, excessive increase in the density of the image in the overlapping range is suppressed. Details of the printing process will be described below.

A3. Printing Process

Figure 6:
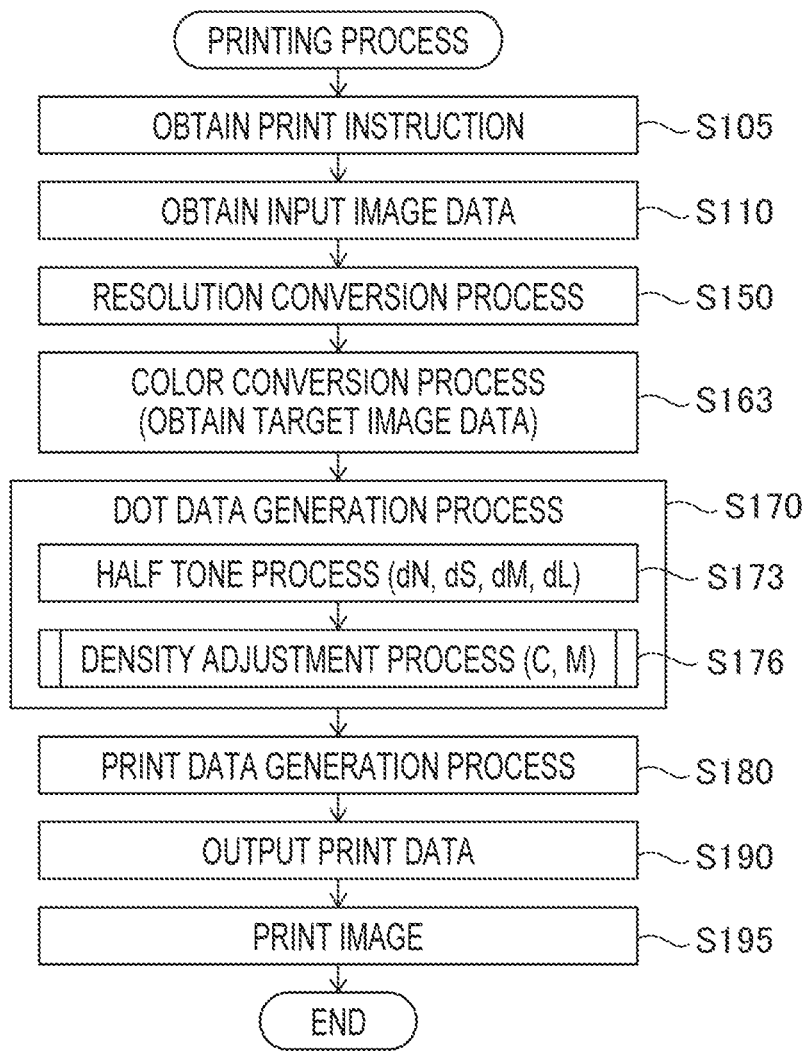
FIG. 6 is a flowchart illustrating an example of a printing process.

FIG. 6 is a flowchart illustrating an example of the printing process. The processor 210 of the first controller 299 (FIG. 1) executes the process of FIG. 6 in accordance with the program 232 in response to a print instruction. In S105, the processor 210 obtains the print instruction. The print instruction may be obtained by any method. In the present embodiment, the user inputs the print instruction by operating the operation interface 250. The print instruction includes information designating input image data to be used in the printing process. The input image data may be various data, and may be, for example, image data stored in the storage 215 (for example, the nonvolatile storage 230). The processor 210 may obtain the print instruction from another device (for example, a computer) connected to the multi-function peripheral 200.

In S110, the processor 210 obtains the input image data designated by the print instruction. In the present embodiment, bitmap data is used as the input image data. It is assumed that a pixel value of each pixel of the input image data is represented by the color values of R (red), G (green) and B (blue) in 256 gradations from 0 to 255. When image data designated by the print instruction is JPEG data, the processor 210 obtains the input image data by expanding the JPEG data. When image data designated by the print instruction is in a format different from the bitmap format (e.g., an enhanced meta file (EMF) format), the processor 210 uses bitmap data generated by converting (e.g., rasterizing) the data format as the input image data.

In S150, the processor 210 executes a process for converting a resolution (i.e., a pixel density) of the input image data to generate input image data of a predetermined printing resolution. Pixels having the printing resolution are the print pixels PX described in FIG. 5. When the resolution of the input image data is the same as the printing resolution, the process of S150 is omitted.

In S163, the processor 210 executes a color conversion process on the input image data. The color conversion process is a process for converting color values (in the present embodiment, RGB values) of the input image data into color values in an ink color space. The ink color space is a color space corresponding to colors of inks of a plurality of types available for printing. In the present embodiment, the ink color space is a CMYK color space. It is assumed that a pixel value of each pixel of the color-converted image data is represented by color values of C, M, Y, and K in 256 gradations from 0 to 255. The processor 210 executes the color conversion process by referring to a conventionally-known color conversion profile indicating a correspondence relationship between the color value in the color space of the input image data and the color value in the ink color space. In the present embodiment, the color conversion profile is a look-up table. However, the color conversion profile may be indicated by data in another format. Hereinafter, image data in the ink color space (i.e., the color-converted image data) is also referred to as ink color image data.

In S170, the processor 210 uses the ink color image data to generate dot data. In the present embodiment, the dot data indicates the dot size for each color component and for each print pixel. As described above, in the present embodiment, the dot size is selected from "0 dN", "Small dS", "Medium dM", and "Large dL".

S170 includes S173 and S176. In S173, the processor 210 executes a halftone process on the ink color image to generate candidate dot data, and stores the generated candidate dot data in the storage 215 (e.g., the non-volatile storage 230). The halftone processing may be a process of various methods such as an error diffusion method and a method using a dither matrix.

Figure 7:
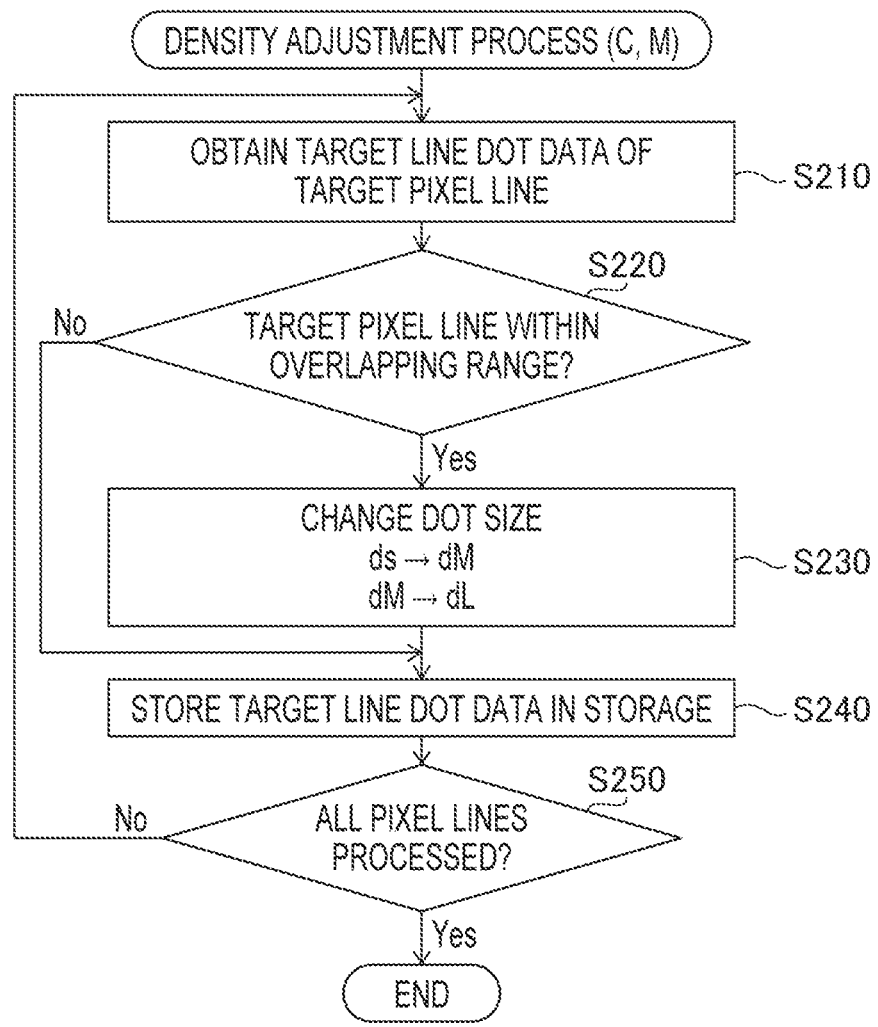
FIG. 7 is a flowchart illustrating an example of a density adjustment process.

In S176, the processor 210 executes a density adjustment process to generate final dot data. FIG. 7 is a flowchart illustrating an example of the density adjustment process. In the present embodiment, the processor 210 adjusts densities of cyan C and magenta M. Densities of yellow Y and black K are not adjusted.

In S210, the processor 210 selects a target pixel line which is a pixel line to be processed from unprocessed pixel lines. Then, the processor 210 obtains target line dot data which is candidate dot data of the target pixel line.

In S220, the processor 210 determines whether the target pixel line is within the overlapping range. When the target pixel line is within the overlapping range (S220: Yes), in S230, the processor 210 changes the dot sizes for the target line dot data as follows. "Small dS" is changed to "medium dM," and "Medium dM" is changed to "Large dL." "Zero dN" and "Large dL" are kept unchanged. Then, the processor 210 proceeds to S240. When the target pixel line is within the non-overlapping range (S220: No), the processor 210 skips S230 and proceeds to S240.

In S240, the processor 210 stores the target line dot data in the storage 215 (e.g., the non-volatile storage 230). When the S230 is executed, the changed target line dot data is stored in the storage 215. When S230 is skipped, data identical to the original target line dot data is stored in the storage 215.

In S250, the processor 210 determines whether all the pixel lines have been processed. When there is one or more unprocessed pixel lines (S250: No), the processor 210 proceeds to S210 and processes a new target pixel line. When all the pixel lines is processed (S250: Yes), the processor 210 ends the process of FIG. 7, that is, the process of S176 in FIG. 6. The processor 210 thereby generates final dot data.

In S180, the processor 210 uses the dot data to generate print data. The data format and generation method of the print data may be any data format and generation method suitable for the print execution engine 400. For example, the processor 210 converts an arrangement order of pieces of data indicating the dot sizes of every pixel (in the illustrated example, gradation data of the selection data SIN) into an order in which the pieces of data are output to the print execution engine 400, and generates print data that can be interpreted by the print execution engine 400 by adding a printer control code.

In S190, the processor 210 outputs the print data to the print execution engine 400. In S195, the print execution engine 400 prints an image according to the print data. Then, the process shown in FIG. 5 ends.

The ink color image data generated in S163 is an example of target image data which is a target of data processing (S170 to S190) including the density adjustment process (S176).

As described above, in the present embodiment, the print execution engine 400 (FIG. 1) includes the head 410, the head driver 414, and the conveyer 440. The head 410 (FIG. 3A) has a plurality of nozzles NZ for ejecting ink. The head driver 414 (FIGS. 3B and 3C) causes the print head 410 to eject ink to form dots on the paper PM. The conveyer 440 (FIG. 2) conveys the paper PM in the conveying direction Dy with respect to the print head 410. The processor 210 also executes a print control process for causing the print execution engine 400 to print an image (also referred to as a print image) using the target image data. The print control process includes the processes of S170 to S190 in FIG. 6. The print image corresponds to an image indicated by the target image data.

As described with reference to FIG. 4, the print control process causes the print execution engine 400 to execute the partial printing for forming dots with the print head 410 and the process of conveying the paper PM with the conveyer 440 a plurality of times using the target image data. Specifically, the processor 210 causes the print execution engine 400 to execute a first partial printing for printing one band image (e.g., the first band image BI1 (FIG. 4)). The processor 210 causes the print execution engine 400 to convey the paper PM after the first partial printing. The processor 210 causes the print execution engine 400 to execute a second partial print for printing the next band image (e.g., the second band image BI2) after the process of conveying the paper PM.

As illustrated in FIG. 4, on the paper PM, a first target range (e.g., the first print target range R1) is a print target range in the conveying direction Dy on which printing is to be performed by the first partial printing, and a second target range (e.g., the second print target range R2) is a print target range in the conveying direction Dy on which printing is to be performed by the second partial printing. The first target range (e.g., the first print target range R1) and the second target range (e.g., the second print target range R2) form an overlapping range (e.g., the overlapping range Rb12) in which edge portions of the first target range and the second target range overlap each other. The first target range (e.g., the first print target range R1) includes a first non-overlapping range (e.g., the non-overlapping range Ra1) that does not overlap the second target range. The second target range (e.g., the second print target range R2) includes a second non-overlapping range (e.g., the non-overlapping range Ra2) that does not overlap the first target range.

In S176 (FIG. 6), as illustrated in FIG. 7, the processor 210 executes different processes for the overlapping range and the non-overlapping range. The print control process of S170 to S190 performed on non-overlapping range data of the target image data corresponding to the non-overlapping range will be referred to as a non-overlapping range process. The non-overlapping range process does not include S230 (FIG. 7). The print control process of S170 to S190 performed on overlapping range data of the target image data corresponding to the overlapping range will be referred to as an overlapping range process. The overlapping range process includes S230. Therefore, the overlapping range process is different from the non-overlapping range process. The processor 210 executes the non-overlapping range process on the non-overlapping range data to cause the print execution engine 400 to print an image in the non-overlapping range. The processor 210 executes the overlapping range process on the overlapping range data to cause the print execution engine 400 to print an image in the overlapping range.

As described with reference to FIG. 7, the process of S230 increases the density of at least a portion of an image to be printed in the overlapping range (specifically, a portion expressed by using the Small dS dots or the Medium dM dots of cyan C or magenta M). That is, the overlapping range process (the processes of S170 to S190 including S230) additionally includes a density control process (S170 including S230) of increasing the density of at least a portion of the image to be printed, as compared with the non-overlapping range process (the processes of S170 to S190 not including S230). Therefore, the likelihood that the image printed in the overlapping range becomes pale can be reduced.

In S170 (i.e., S173 and S176) in FIG. 6, the processor 210 generates the dot data indicating the dot size for each pixel using the target image data (in the illustrated example, the ink color image data). That is, the non-overlapping range process includes a non-overlapping range dot data generation process for generating non-overlapping range dot data indicating an image within the non-overlapping range using the non-overlapping range data (the process of S170 (FIG. 6) not including S230 in FIG. 7). The overlapping range process includes an overlapping range dot data generation process for generating overlapping range dot data indicating an image within the overlapping range using the overlapping range data (the process of S170 (FIG. 6) including the process of S230 in FIG. 7).

For the non-overlapping range, the process of S230 in FIG. 7 is omitted. Therefore, the dot size indicated by the non-overlapping range dot data is the dot size selected in S173 (FIG. 6). That is, the non-overlapping range dot-data generation process includes S173. S173 corresponds to selecting a dot size from a non-overlapping range dot size set consisting of a plurality of sizes (dN, dS, dM, and dL) including a zeroth size (dN) corresponding to an ink amount of zero and a first size (dS) corresponding to an ink amount larger than 0.

For the overlapping range (in particular, cyan C and magenta M), the process of S230 in FIG. 7 is executed. In S230, Small dS is replaced with Medium dM. That is, Medium dM is a dot size substituting Small dS. As described above, the overlapping range dot data generation process includes, as the density control process, selecting a dot size from an overlapping range dot size set consisting of a plurality of sizes (in the illustrated example, dN, dM, and dL) including the zeroth size (in the illustrated example, dN) and an alternative size (in the illustrated example, dM) (i.e., S170 including S230). The alternative size is a size corresponding to an ink amount larger than an ink amount corresponding to the first size and is for substituting the first size. Therefore, the likelihood that the image printed in the overlapping range becomes pale can be reduced.

The plurality of nozzles NZ of the print head 410 (FIG. 3A) include nozzles NZ (in the illustrated example, the nozzles NZ of the nozzle group NY) for ejecting ink of yellow Y, and nozzles NZ (in the illustrated example, the nozzles NZ of the nozzle group NC) for ejecting the ink of cyan C. In the present embodiment, S230 of FIG. 7 may be executed for cyan C and magenta M. S230 is not executed for yellow Y and black K. As described above, the density control process (S170 including S230) increases a density of at least a portion of a partial image represented by dots of a second ink (in the illustrated example, cyan C) without changing a density of a partial image represented by dots of a first ink (in the illustrated example, yellow Y) in the image to be printed. Therefore, the likelihood that the partial image represented by the dots of the second ink (for example, cyan C) in the image to be printed in the overlapping range becomes pale can be reduced. Further, since the processor 210 does not increase the density of yellow Y, consumption of the ink of yellow Y can be saved, as compared with a case where the density of yellow Y is increased. It is noted that the visibility of dots of yellow Y is lower than the visibility of dots of cyan C. Therefore, even when the density of yellow Y is not increased, the decrease in the density of yellow Y is less noticeable.

B. Second Embodiment

Figure 8A:
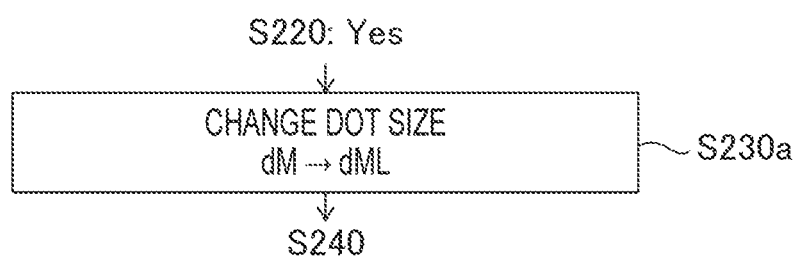
FIG. 8A is a flowchart of another example of the density adjustment process.

FIG. 8a is a flowchart of a second embodiment of the density adjustment process. The only difference from the embodiment illustrated in FIG. 7 is that S230 is replaced with S230a. Although not shown, the other portions of the density adjustment process are the same as the corresponding portions in FIG. 7 (Steps identical to those in FIG. 7 are denoted by the same reference numerals, and the description thereof is omitted.).

Figure 8B:
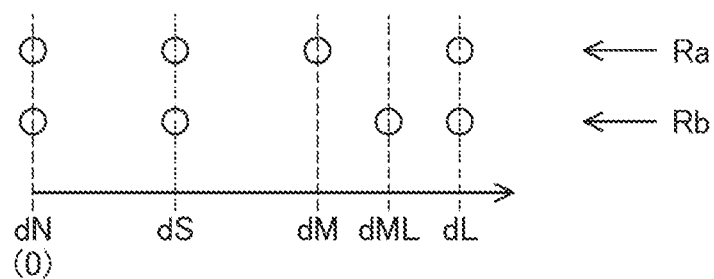
FIG. 8B illustrates sets of dot sizes.

In S230a, the processor 210 changes the dot size "Medium dM" for the target line dot data to "Medium-large dML." The processor 210 does not change the other dot sizes dN, dS and dL. FIG. 8B illustrates a set of dot sizes. In the drawing, a non-overlapping range dot size set Ra and an overlapping range dot size set Rb are shown. The horizontal axis represents the dot size. The non-overlapping range dot size set Ra is the same as the set in the first embodiment, and consists of four dot sizes of dN, dS, dM and dL. The overlapping range dot size set Rb is a set obtained by replacing dM of the non-overlapping range dot size set Ra with dML, and consists of four dot sizes of dN, dS, dML and dL. As shown, the dot size of Medium-large dML is between Medium dM and Large dL.

As described above, the non-overlapping range dot size set (in the illustrated example, Ra) includes a zeroth size (in the illustrated example, dN), a first size (in the illustrated example, dM), and a second size (in the illustrated example, dL) being a size corresponding to an ink amount larger than an ink amount corresponding to the first size. The alternative size (in the illustrated example, dML) used in place of the first size corresponds to an ink amount larger than the ink amount corresponding to the first size. Therefore, in the present embodiment, the likelihood that the image printed in the overlapping range becomes pale can be reduced. The alternative size (in the illustrated example, dML) corresponds to an ink amount between the first size and the second size. Therefore, in the present embodiment, the likelihood that the image printed in the overlapping range becomes excessively dark can be reduced, as compared with a case where Medium dM is replaced with Large dL.

C. Third Embodiment

Figure 9A:
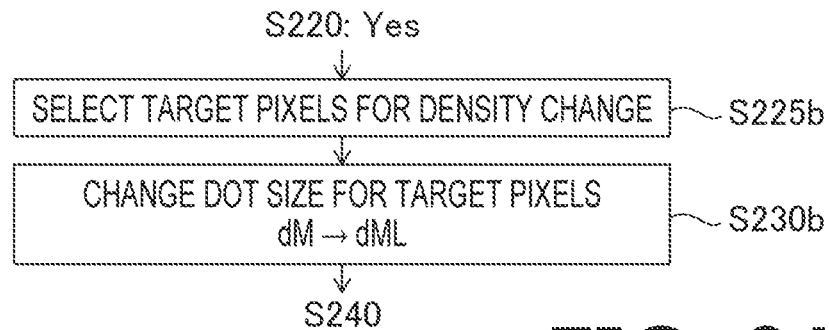
FIG. 9A is a flowchart of another example of the density adjustment process.

FIG. 9A is a flowchart of a third embodiment of the density adjustment process. The only difference from the embodiment illustrated in FIG. 7 is that S230 is replaced with S225b and S230b. Although not shown, the other portions of the density adjustment process are the same as the corresponding portions in FIG. 7 (Steps identical to those in FIG. 7 are denoted by the same reference numerals, and the description thereof is omitted.).

Figure 9B:
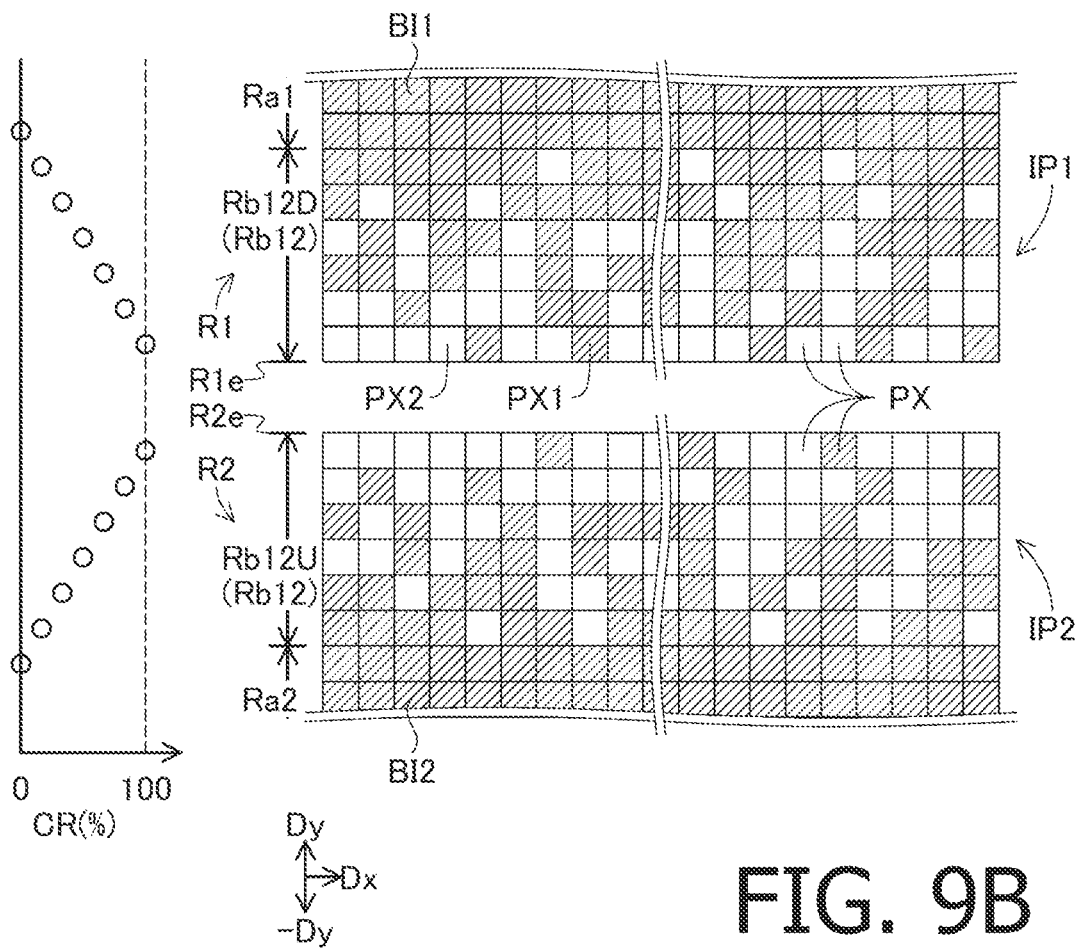
FIG. 9B illustrates a change rate indicating a ratio of target pixels.

In S225b, the processor 210 selects target pixels which are targets of density change from a plurality of pixels of the target pixel line. FIG. 9B illustrates a change rate CR indicating a ratio of target pixels. In FIG. 9B, as in FIG. 5, a plurality of print pixels PX of an edge portion on the −Dy direction side of the first print target range R1 and an edge portion on the +Dy direction side of the second print target range R2 are illustrated. The change rate CR for each pixel line is shown on the left side of the drawing. The change rate CR is a ratio of a total number of the target pixels to a total number of the plurality of permitted pixels PX1 in the pixel line.

As illustrated, in the downstream overlapping range Rb12D, the change rate CR gradually increases in the −Dy direction. In the present embodiment, the change rate CR of a pixel line at the edge on the −Dy direction side is 100%. In the upstream overlapping range Rb12U, the change rate CR gradually increases in the +Dy direction. In the present embodiment, the change rate CR of the pixel line at the edge on the +Dy direction side is 100%. In the non-overlapping ranges Ra1 and Ra2, the change rate CR is 0%. As described above, in each of the print target ranges R1 and R2, the closer to the edges R1e and R2e of the print target ranges R1 and R2, the higher the change rate CR. Positions of the target pixels in each pixel line is set in advance.

In S230b (FIG. 9A), the processor 210 changes the dot size "Medium dM" for the target pixels of the target line dot data to "Medium-large dML." The processor 210 does not change the dot size "Medium dM" for pixels which are not the target pixels and the other dot sizes dN, dS, and dL.

The plurality of permitted pixels PX1 in the downstream overlapping range Rb12D in FIG. 9B indicates a first portion IP1 which is a portion of the image of the overlapping range Rb12 to be printed by the partial printing for the first print target range R1. In the downstream overlapping range Rb12D, the change rate CR increases toward the edge R1e on the second print target range R2 side of the first print target range R1. As described above, the processor 210 increases the density of the first portion IP1 as the first portion IP1 gets closer to the edge R1e on the second print target range R2 side of the first print target range R1. In addition, the plurality of permitted pixels PX1 in the upstream overlapping range Rb12U indicate a second portion IP2 which is a portion of the image of the overlapping range Rb12 to be printed by the partial print for the second print target range R2. In the upstream overlapping range Rb12U, the change rate CR increases toward the edge R2e on the first print target range R1 side of the second print target range R2. As described above, the processor 210 increases the density of the second portion IP2 as the second portion IP2 gets closer to the edge R2e on the first print target range R1 side of the second print target range R2.

The likelihood that the image becomes pale in the vicinity of the edge R1e of the first print target range R1 on the second print target range R2 side and in the vicinity of the edge R2e of the second print target range R2 on the first print target range R1 side can be thereby reduced.

In the present embodiment, as described with reference to FIG. 5, in the downstream overlapping range Rb12D, the recording rate Rr decreases toward the edge R1e. Therefore, the closer it is to the edge R1e, the longer the interval time (e.g., the interval time T2 in FIG. 5) is. Accordingly, as described in FIG. 5, the residual vibration is attenuated (i.e., the residual vibration is not sufficient or the vibration does not remain) at the time of discharge of the ink droplets. Therefore, the actual size of the dots on the paper PM tends to be small. In the present embodiment, for each pixel line in the downstream overlapping range Rb12D, the change rate CR increases as the recording rate Rr decreases. Similarly, in the upstream overlapping range Rb12U, the change rate CR increases as the recording rate Rr decreases. Therefore, a decrease in the density of the image printed in the overlapping range can be appropriately suppressed.

D. Fourth Embodiment

FIG. 10A is a flowchart of a fourth embodiment of the density adjustment process. The only difference from the embodiment illustrated in FIG. 7 is that S230 is replaced with S230c. Although not shown, the other portions of the density adjustment process are the same as the corresponding portions in FIG. 7 (Steps identical to those in FIG. 7 are denoted by the same reference numerals, and the description thereof is omitted.).

In S230c, the processor 210 changes the dot size "Medium dM" for the target line dot data to "Medium-large dML," and further changes the dot size "Large dL" for the target line dot data to "Medium-large dML." The other dot sizes dN and dS are maintained. The process of S230c is the same as the process obtained by adding the process of changing "Large dL" to "Medium-large dML" to the process of S230a in FIG. 8A. The reason "Large dL" is changed to "Medium-large dML" corresponding to a smaller ink amount is as follows.

FIGS. 10B to 10D are schematic diagrams illustrating examples of dots formed on the paper PM. FIG. 10B illustrates two pixels PX adjacent to each other in the non-overlapping range. The dot size of each pixel PX is "Large dL." A first state Sb1 illustrated in the drawing indicates a state in which ink droplets are ejected on the paper PM at positions of these pixels PX. Two dots dtL are formed and are in contact with each other. A second state Sb2 indicates a state in which time has elapsed from the first state Sb1. Since ink permeates into the paper PM over time, the size of each dot dtL increases.

FIG. 10C illustrates two pixels PX adjacent to each other in the overlapping range. The dot size of each pixel PX is "large dL." A first state Sc1 illustrated in the drawing indicates a state in which an ink droplet is ejected by one partial printing. In the illustrated example, one dot dtL is formed at a position of the pixel PX on the left. The second state Sc2 indicates a state in which time has elapsed from the first state Sc1. Since ink permeates into the paper PM over time, the size of the dot dtL increases. The third state Sc3 indicates a state in which an ink droplet is ejected by the second partial printing after the second state Sc2. A dot dtL is formed at a position of the pixel PX on the right. The fourth state Sc4 indicates a state in which time has elapsed from the third state Sc3.

In the fourth state Sc4, the size of the right dot dtL on the paper is significantly increased. The reason is as follows. In general, ink can easily move on the paper until it is absorbed by the paper after being ejected on the paper. When two dots come into contact with one another on the paper, the inks of the two dots attract each other due to the influence of the surface tension of the inks and the like. As described above, in the third state Sc3 in which the right dot dtL is formed, the ink of the left dot dtL is already absorbed by the paper. Therefore, it is difficult for the ink of the left dot dtL to move on the paper. In this state, an ink droplet is ejected at the right pixel position. The ink of the dot dtL on the right side may be drawn by the ink of the dot dtL on the left side before being absorbed by the paper to flow in a wide range. A contact portion Pc3 between the two dots in the third state Sc3 is larger than a contact portion PM between the two dots in the first state Sb1 illustrated in FIG. 10B. Therefore, in the overlapping range, the actual size on the paper of the dot with the size of "Large dL" tends to be larger than that in the non-overlapping range.

Therefore, in the present embodiment, in S230c (FIG. 10A), the processor 210 changes "Large dL" to "Medium-large dML." FIG. 10D illustrates two pixels PX adjacent to each other in the overlapping range. The dot size of each pixel PX is "Medium-large dML." A first state Sd1 illustrated in the drawing indicates a state in which an ink droplet is ejected by one partial printing. One dot dtML is formed at the position of the left pixel PX. A second state Sd2 indicates a state in which time has elapsed from the first state Sd1. The size of the dot dtML is increased. A third state Sd3 indicates a state in which an ink droplet is ejected by the second partial printing after the second state Sd2. A dot dtML is formed at the position of the right pixel PX. A fourth state Sd4 indicates a state in which time has elapsed from the third state Sd3. The size of the dot dtML on the right is increased. However, an area occupied by the two dots dtML in the fourth state Sd4 is smaller than an area occupied by the two dots dtML in the fourth state Sc4 illustrated in FIG. 10C. For example, the area occupied by the two dots dtML in the fourth state Sd4 is substantially the same as an area occupied by the two dots dtML in the second state Sb2 illustrated in FIG. 10B.

As described above, in the overlapping range, when a dot having a large size (for example, a size larger than the alternative size (in the illustrated example, "Medium-large dM L")) is formed, the density of the image may become high. In the present embodiment, the processor 210 changes "Large dL" to a smaller size (in the illustrated example, "Medium-large dML") in S230c (FIG. 10A). Therefore, an unintended increase in the density in the overlapping range can be suppressed.

E. Fifth Embodiment

Figure 11:
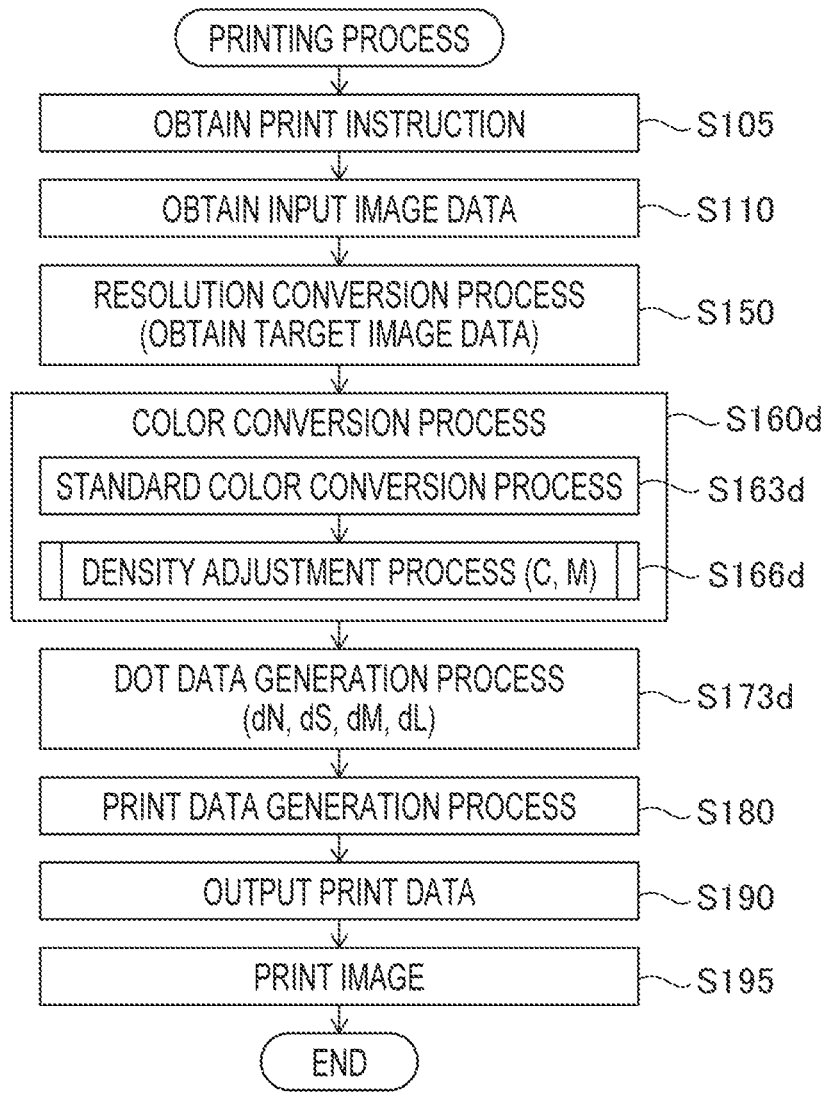
FIG. 11 is a flowchart of another example of the printing process.

FIG. 11 is a flowchart of another embodiment of the printing process. The difference from the printing process illustrated in FIG. 6 is that the density of the overlapping range is adjusted in the color conversion process. In FIG. 11, Steps identical to those in FIG. 6 are denoted by the same reference numerals, and the description thereof will be omitted.

S105 to S150 in FIG. 11 are the same as S105 to S150 in FIG. 6, respectively. In S160d, the processor 210 executes the color conversion process on the input image data. S160d includes S163d and S166d. S163d is the same as S163 in FIG. 6. In S163d, the processor 210 generates the candidate ink color image data by executing a color conversion process on the input image data. In S166d, the processor 210 generates the final ink color image data by executing the density adjustment process. As described above, the result of the color conversion process in S163d is adjusted in S166d. The color conversion process in S163d is a standard color conversion process.

Figure 12:
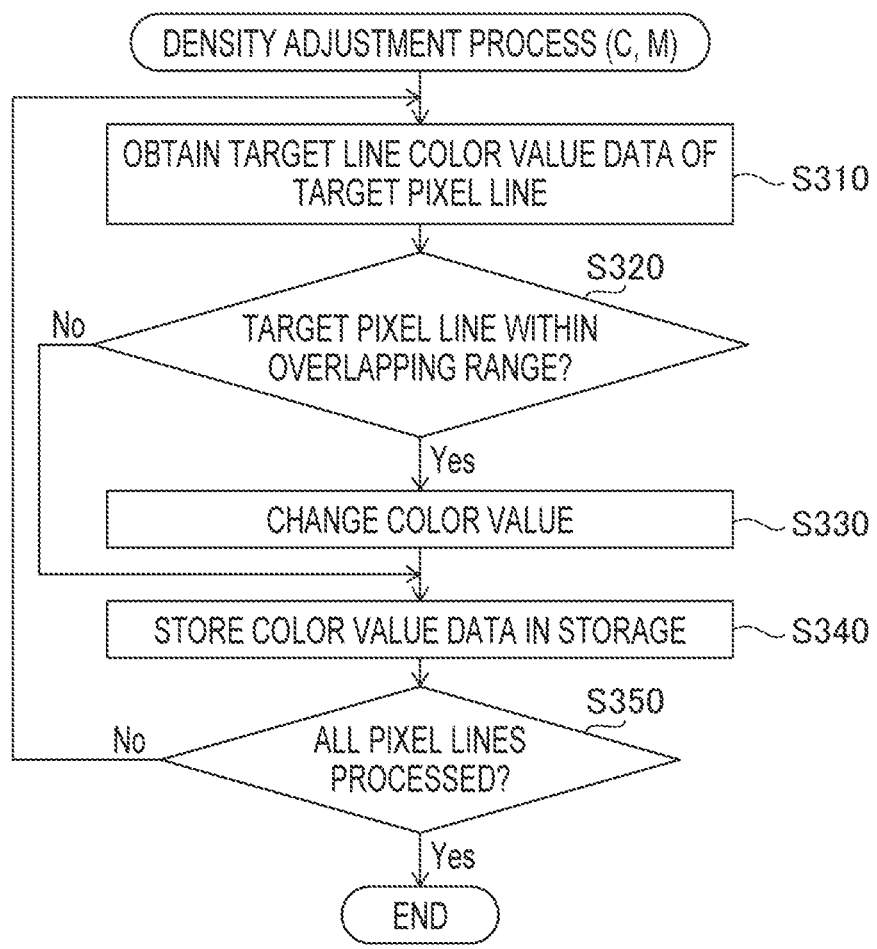
FIG. 12 is a flowchart illustrating an example of the density adjustment process.

FIG. 12 is a flowchart illustrating an example of the density adjustment process. The difference from the density adjustment process illustrated in FIG. 7 is that color value data of the ink color image data is adjusted in place of the dot data. In the present embodiment, the processor 210 adjusts the densities of cyan C and magenta M. The densities of yellow Y and black K are not adjusted.

In S310, the processor 210 selects a target pixel line, which is a pixel line to be processed, from unprocessed pixel lines. Then, the processor 210 obtains target line color value data which is color value data of the target pixel line of the candidate ink color image data.

In S320, the processor 210 determines whether the target pixel line is within the overlapping range. When the target pixel line is within the overlapping range (S320: Yes), in S330, the processor 210 adjusts the color value of cyan C and the color value of magenta M of each of the plurality of pixels in the target line color value data by using a tone curve.

Figure 13:
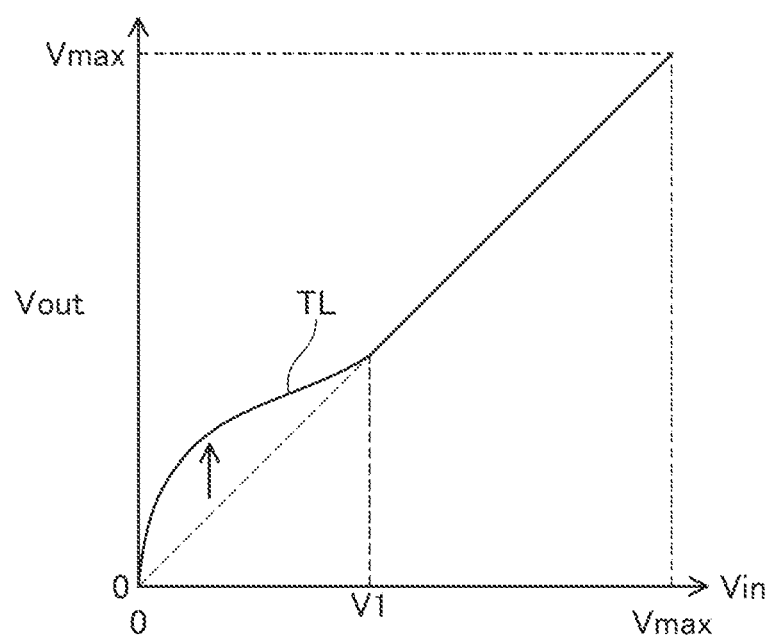
FIG. 13 is a graph showing an example of a tone curve.

FIG. 13 is a graph showing an example of the tone curve. The horizontal axis represents an input color value Vin which is a color value before adjustment, and the vertical axis represents an output color value Vout which is a color value after adjustment. A value Vmax is the maximum value of the color value (in the illustrated example, 255). The larger the input color value Vin, the higher the density. A tone curve TL shows a relationship between the input color value Vin and the output color value Vout. As illustrated, when the input color value Vin is lower than a first threshold value V1, the output color value Vout becomes larger than the input color value Vin (however, when Vin=0, Vout=0). The tone curve TL is configured such that the output color value Vout smoothly changes with respect to a change in the input color value Vin over the entire range of the input color value Vin. In the present embodiment, the tone curve TL is set in advance. The processor 210 adjusts the color value by referring to a conventionally-known tone profile indicating the tone curve TL. In the present embodiment, the tone profile is a look-up table. However, the tone profile may be indicated by data of other format.

After S330, the processor 210 proceeds to S340. When the target pixel line is within the non-overlapping range (S320: No), the processor 210 skips S330 and proceeds to S340.

In S340, the processor 210 stores the target line color value data in the storage 215 (e.g., the non-volatile storage 230). When S330 is executed, the adjusted target line color value data is stored in the storage 215. When S330 is skipped, the same data as the original target line color value data is stored in the storage 215.

In S350, the processor 210 determines whether all pixel lines have been processed. When there is one or more unprocessed pixel lines (S350: No), the processor 210 proceeds to S310 and processes a new target pixel line. When all the pixel lines is processed (S350: Yes), the processor 210 ends the process of FIG. 12, that is, the processing of S166d in FIG. 11. The processor 210 thereby generates final ink color image data. The process of S160d then ends.

S173d in FIG. 11 is the same as S173 in FIG. 6. The processor 210 generates dot data by executing the halftone process on the ink color image data. S180 to S195 in FIG. 11 are the same as S180 to S195 in FIG. 6, respectively.

The input image data of the print resolution generated in S150 is an example of a target image data which is a target of the data processing (S160d to S190) including the density adjustment process (S166d).

As described above, in the present embodiment, the processor 210 executes the print control process of causing the print execution engine 400 to print the print image using the target image data. The print control process includes S160d to S190 in FIG. 11.

In S166d, as illustrated in FIG. 12, the processor 210 executes different processes for the overlapping range and the non-overlapping range. The print control process of S160d to S190 performed on non-overlapping range data of the target image data corresponding to the non-overlapping range will be referred to as a non-overlapping range process. The non-overlapping range process does not include S330 (FIG. 12). The print control process of S160d to S190 performed on overlapping range data of the target image data corresponding to the overlapping range will be referred to as an overlapping range process. The overlapping range process includes S330. As described above, the overlapping range process is different from the non-overlapping range process. The processor 210 causes the print execution engine 400 to print the image in the non-overlapping range by executing the non-overlapping range process on the non-overlapping range data. The processor 210 causes the print execution engine 400 to print the image in the overlapping range by executing the overlapping range process different from the non-overlapping range process on the overlapping range data.

As described with reference to FIG. 13, the process of S330 (FIG. 12) increases the density of at least a portion of the image to be printed in the overlapping range (specifically, a portion in which the color value of cyan C or magenta M is less than the first threshold value V1). For example, when the color value of cyan C is less than the first threshold value V1, the color value of cyan C increases. As a result, the dot size determined in S173d (FIG. 11) may become larger than that in the case where S330 (FIG. 12) is not executed. As described above, the overlapping range process (the processes of S160d to S190 including S330) additionally includes the density control process (S160d including S330) of increasing the density of at least a portion of the image to be printed, as compared with the non-overlapping range process (processes of S160d to S190 not including S330). Therefore, the likelihood that the image printed in the overlapping range becomes pale can be reduced.

In the present embodiment, S330 in FIG. 12 may be executed for cyan C and magenta M. S330 is not executed for yellow Y and black K. Therefore, as in the first to fourth embodiments described above, the likelihood that the partial image of cyan C and the partial image of magenta M becomes pale in the image printed in the overlapping range can be reduced. Further, since the processor 210 does not increase the density of yellow Y, consumption of the ink of yellow Y can be saved, as compared with the case where the density of yellow Y is increased.

F. Sixth Embodiment

Figure 14A:
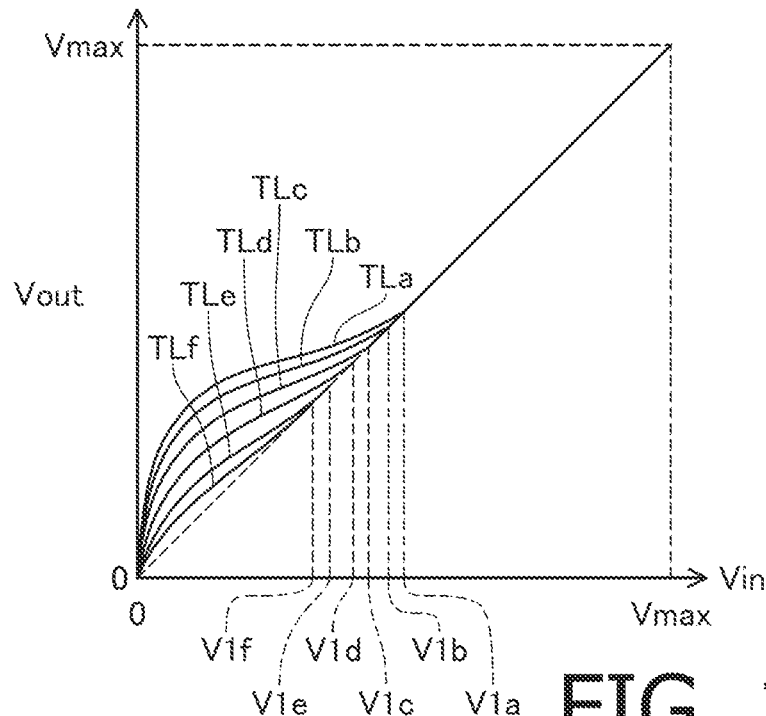
FIG. 14A is a schematic diagram showing another example of the tone curve.
Figure 14B:
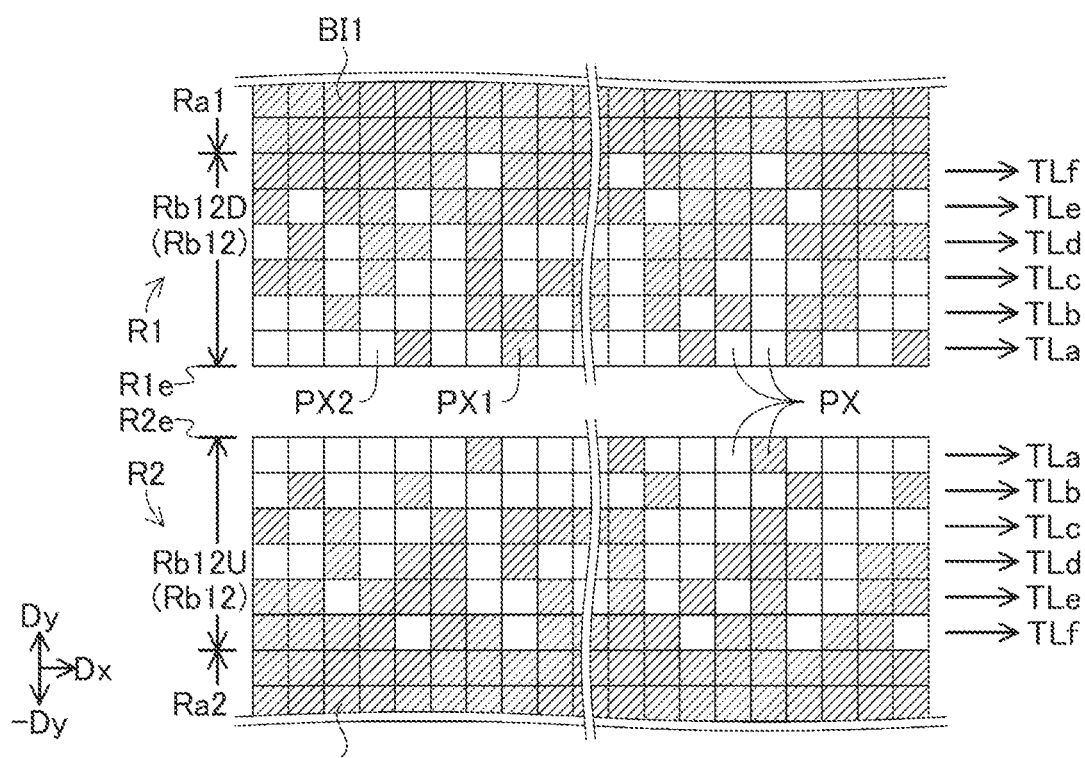
FIG. 14B is a schematic diagram showing another example of the tone curve.

FIGS. 14A and 14B are schematic diagrams illustrating another embodiment of the tone curve. FIG. 14A is a graph showing a tone curve. The horizontal axis represents the input color value Vin, and the vertical axis represents the output color value Vout. The illustrated six tone curves TLa to TLf are used in place of the tone curve TL (FIG. 13) in S330 of FIG. 12. Threshold values V1a to V1f are associated with the tone curves T1a to TLf, respectively. As shown in the drawing, the threshold values V1a to V1f become smaller in this order. The tone curves T1a to TLf change the output color value Vout to a value larger than the input color value Vin when the input color value Vin is less than the threshold values V1a to V1f, respectively. When the input color value Vin is the same, the changed output color values Vout obtained by T1a to TLf, respectively, become smaller in this order. That is, amounts of increase in concentration obtained by T1a to TLf, respectively, become smaller in this order. In T1a to TLf, respectively, widths of a range of the input color value Vin in which the density increases become smaller in this order. For example, in the image within the overlapping range, a portion in which the density increases by the first tone curve T1a may be larger than a portion in which the density increases by the sixth tone curve TLf. The six tone curves T1a to TLf are set in advance.

FIG. 14B is a schematic diagram illustrating a correspondence relationship between the tone curves T1a to TLf and the pixel lines. As in FIG. 5, a plurality of print pixels PX of an edge portion on the −Dy direction side of the first print target range R1 and an edge portion on the +Dy direction side of the second print target range R2 are illustrated. The correspondence between the pixel lines and the tone curves is shown on the right side of the drawing. As illustrated, in the downstream overlapping range Rb12D, the amount of increase in the concentration gradually increases in the −Dy direction. In the upstream overlapping range Rb12U, the amount of increase in the concentration gradually increases in the +Dy direction. As described above, in each of the print target ranges R1 and R2, the closer to the edge R1e or R2e of the print target range R1 or R2, the larger the amount of increase in the density.

In S330 (FIG. 12), the processor 210 specifies the tone curve associated with the target pixel line. Then, the processor 210 adjusts the color value of cyan C and the color value of magenta M of each of the plurality of pixels of the target line color value data using the specified tone curve.

The likelihood that the image becomes pale in the vicinity of the edge R1e on the second print target range R2 side of the first print target range R1 and in the vicinity of the edge R2e on the first print target range R1 side of the second print target range R2 can be thereby reduced.

Further, in the present embodiment, as described with reference to FIG. 5, in the downstream overlapping range Rb12D, the recording rate Rr decreases toward the edge R1e. Therefore, the closer to the edge R1e, the longer the interval time (e.g., the interval time T2 in FIG. 5) becomes, and therefore the actual size of the dots on the paper PM tends to become smaller In the present embodiment, for each pixel line in the downstream overlapping range Rb12D, the smaller the recording rate Rr, the larger the amount of increase in the density. Similarly, in the upstream overlapping range Rb12U, the smaller the recording rate Rr, the larger the amount of increase in the density. Therefore, a decrease in the density of the image printed in the overlapping range can be appropriately suppressed.

G. Seventh Embodiment

Figure 15:
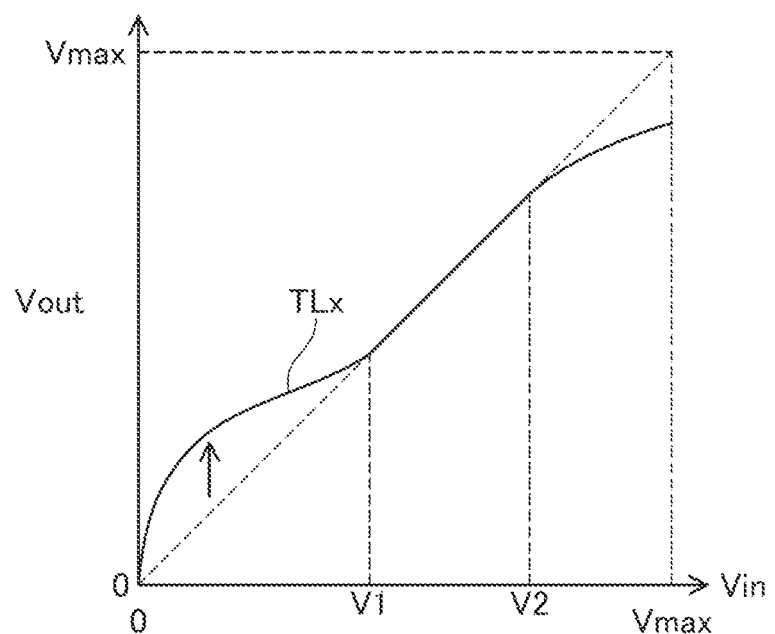
FIG. 15 is a schematic diagram showing another example of the tone curve.

FIG. 15 is a schematic diagram illustrating another embodiment of the tone curve. The horizontal axis represents the input color value Vin, and the vertical axis represents the output color value Vout. The tone curve TLx is used in place of the tone curve TL (FIG. 13) in S330 of FIG. 12. The difference from the tone curve TL in FIG. 13 is that the output color value Vout is smaller than the input color value Vin when the input color value Vin is larger than the second threshold value V2 (V1<V2). The tone curve TLx is configured such that the output color value Vout smoothly changes with respect to a change of the input color value Vin over the entire range of the input color value Vin. In the present embodiment, the tone curve TLx is set in advance.

The process of S330 (FIG. 12) using the tone curve TLx reduces the density of at least a portion of the image to be printed in the overlapping range (specifically, a portion having a color value of cyan C or magenta M larger than the second threshold value V2). For example, when the color value of cyan C is larger than the second threshold value V2, the color value of cyan C decreases. As a result, the dot size determined in the S173d (FIG. 11) may become smaller than that in a case where S330 (FIG. 12) is not executed. Therefore, as in the embodiment illustrated in FIG. 10A, an unintended increase in the density of the overlapping range can be suppressed.

H. Eighth Embodiment

Figure 16:
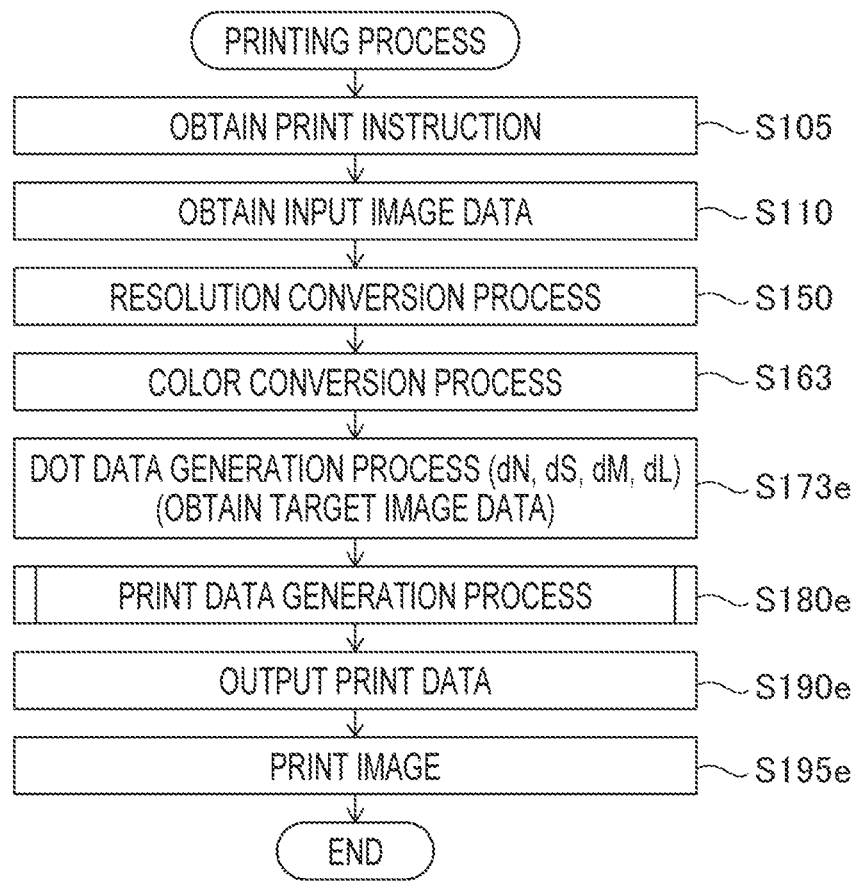
FIG. 16 is a flowchart of another example of the printing process.

FIG. 16 is a flowchart of another embodiment of the printing process. The difference from the printing process illustrated in FIG. 6 is that the density adjustment is performed in the print data generation process. In FIG. 16, Steps identical to those in FIG. 6 are denoted by the same reference numerals, and the description thereof is omitted.

S105 to S163 are the same as S105 to S163 in FIG. 6, respectively. S173e is the same as S173 of FIG. 6. In the present embodiment, the processor 210 generates the dot data by a halftone processing which is the same as the one in S173.

Figure 17:
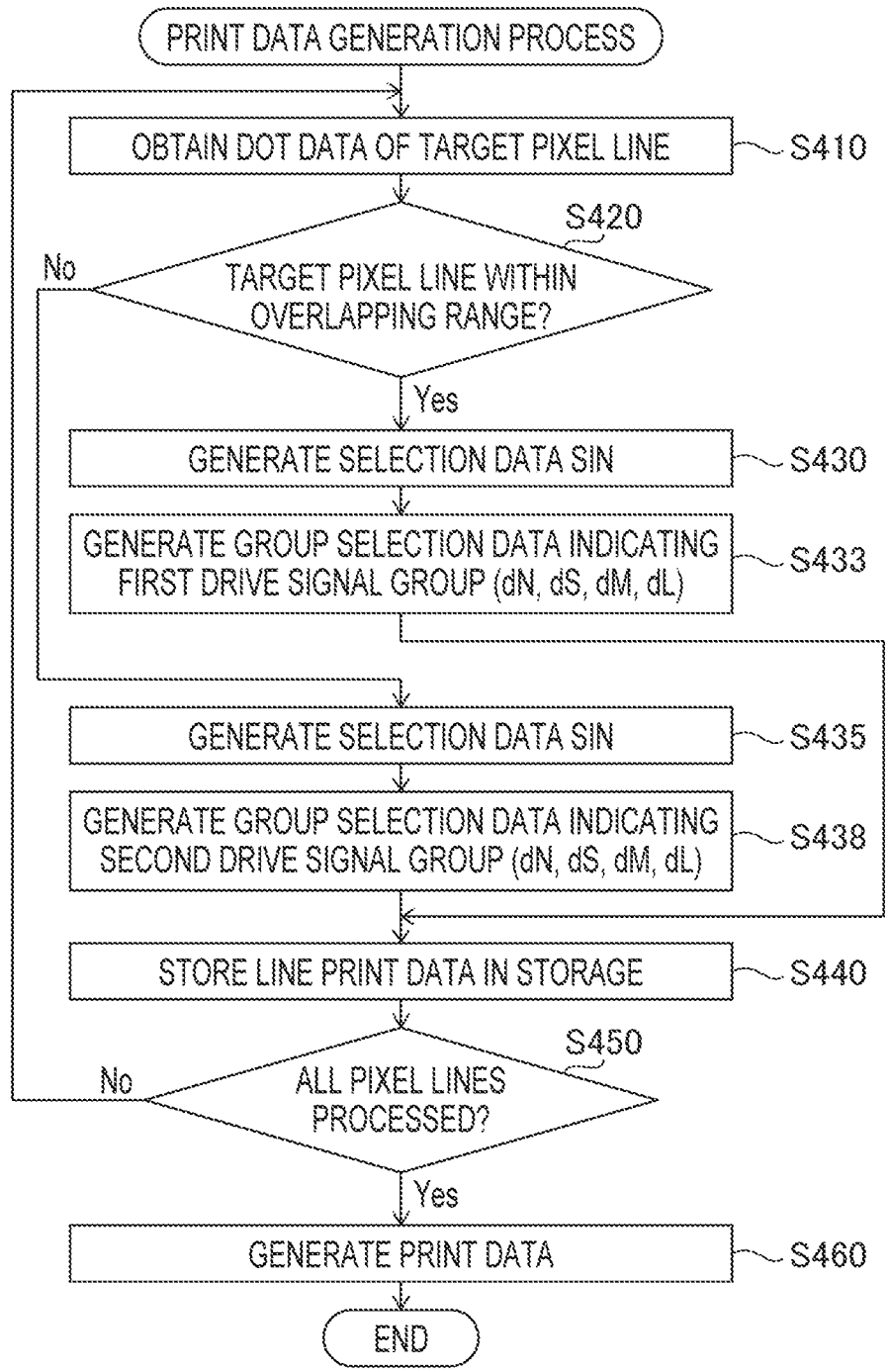
FIG. 17 is a flowchart illustrating an example of a print data generation process.

In S180e, the processor 210 generates print data. FIG. 17 is a flowchart illustrating an example of the print data generation process. In S410, the processor 210 selects a target pixel line, which is a pixel line to be processed, from unprocessed pixel lines. Then, the processor 210 obtains target line dot data which is dot data of the target pixel line. The dot data indicates the dot size of each pixel. The dot size of each pixel is selected from four sizes of "Zero," "Small," "Medium" and "Large." The head driver 414 (FIG. 3C) supplies a driving signal corresponding to the dot size to each of the individual electrodes 413c. In the present embodiment, a first drive signal group for the overlapping range and a second drive signal group for the non-overlapping range are used as the drive signal group consisting of four drive signals associated with the four dot sizes.

Figure 18A:
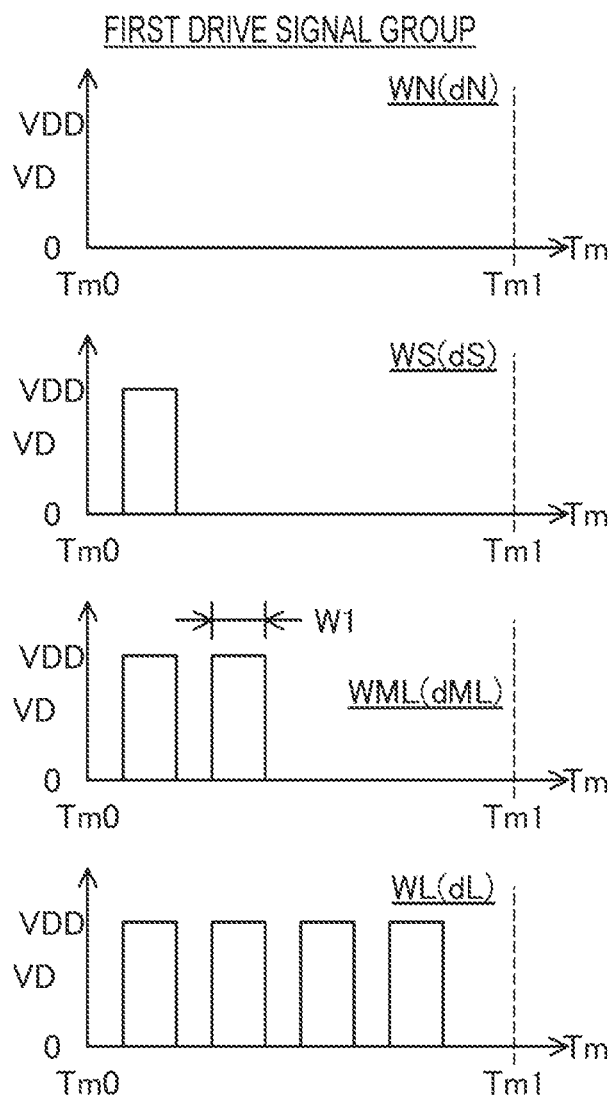
FIG. 18A illustrates an example of a first drive signal group.

FIG. 18A illustrates an example of the first drive signal group. In the drawing, graphs of four drive signals WN, WS, WML and WL (also simply referred to as signals WN to WL) corresponding to "Zero," "Small," "Medium" and "Large," respectively, are shown. The horizontal axis represents time Tm, and the vertical axis represents a voltage VD supplied to the individual electrode 413c. The graph of each of the signal WN to WL shows a waveform of the voltage VD in the recording cycle T (a time period from the time point Tm0 to the time point Tm1).

A zero signal WN corresponding to "Zero" indicates that the voltage VD is maintained at 0. A small signal WS corresponding to "Small" indicates one pulse in which the voltage VD changes between zero and a driving voltage VDD. A medium-large signal WML corresponding to "Medium" indicates two pulses. A first time width W1 indicates a time width of the second pulse. A large signal WL corresponding to "Large" indicates four pulses. These signals WN, WS, WML and WL correspond to the dot sizes dN, dS, dML and dL, respectively. As described above, as the number of pulses increases, the volume of the ink droplet ejected from the nozzle NZ increases.

Figure 18B:
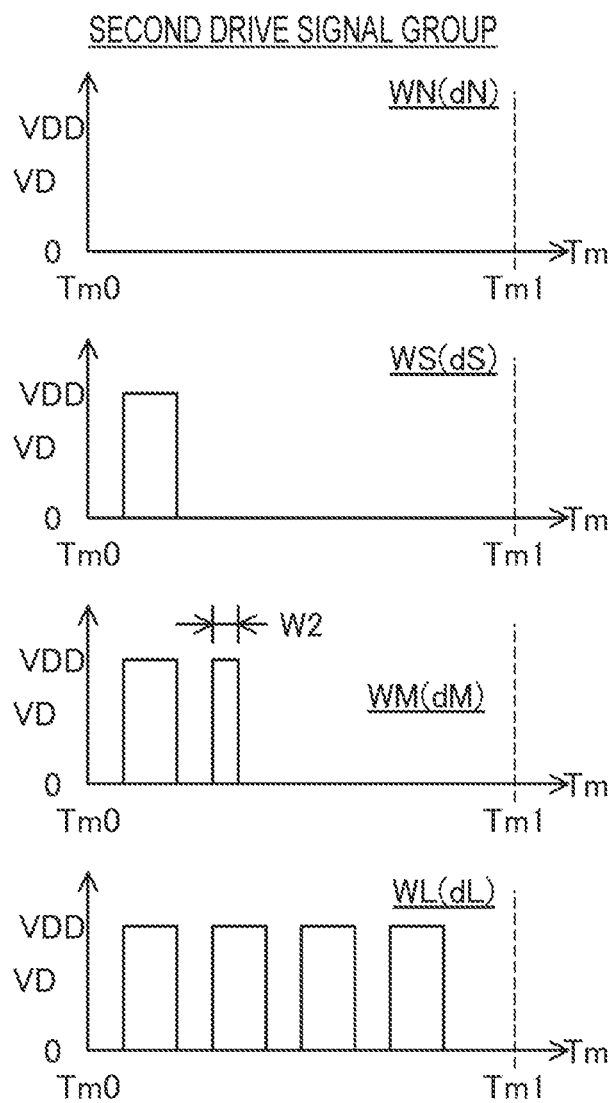
FIG. 18B illustrates an example of a second drive signal group.

FIG. 18B illustrates an example of the second drive signal group. The only difference from the first drive signal group is that a second time width W2 of a second pulse of a medium signal WM corresponding to "Medium" is smaller than a first time width W1 of the medium-large signal WML (FIG. 18A). In the present embodiment, when the time width of the pulse is small, the volume of the ejected ink droplet becomes small. Further, in the present embodiment, the medium signal WM corresponds to the dot size of Medium dM. That is, the dot size corresponding to the medium signal WM is smaller than the "Medium-large dML" corresponding to the medium-large signal WML in FIG. 18A. The signals WN, WS, and WL corresponding to "Zero," "Small" and "Large" are the same as the signals WN, WS and WL in FIG. 18A, respectively.

FIG. 18C is a table showing a relationship between the dot size indicated by the dot data, the waveform data FIRE, the drive signal group, and the gradation data of the selection data SIN. As described above, the waveform data FIRE indicates four pieces of drive waveform data corresponding to the four dot sizes. In the present embodiment, the waveform data FIRE may represent four pieces of driving waveform data of the first drive signal group and four pieces of driving waveform data of the second drive signal group. The first drive signal group includes four pieces of drive waveform data corresponding to dN, dS, dML and dL. The second drive signal group includes four pieces of drive waveform data corresponding to dN, dS, dM and dL. In the present embodiment, each drive waveform data is expressed in three bits.

The gradation data of the selection data SIN is data for selecting one of the four driving waveform data. The gradation data of the selection data SIN indicates one of four dot sizes ("Zero", "Small", "Medium", and "Large"). In the present embodiment, the gradation data of the selection data SIN is expressed in two bits.

In S420 of FIG. 17, the processor 210 determines whether the target pixel line is within the overlapping range. When the target pixel line is within the overlapping range (S420: Yes), in S430, the processor 210 refers to the target line dot data and generates the gradation date of each pixel for the selection data SIN. In S433, the processor 210 generates group selection data indicating the first drive signal group. In S440, the processor 210 stores line print date including the pieces of data generated in S430 and S433 in the storage 215 (e.g., the nonvolatile storage 230). The line print data is print data of the target pixel line.

When the target pixel line is within the non-overlapping range (S420: No), in S435, the processor 210 refers to the target line dot data and generates the gradation data of each pixel for the selection data SIN. The process in S435 is the same as the process in S430. In S438, the processor 210 generates a group selection data indicating the second drive signal group. In S440, the processor 210 stores the line print data including the prices of data generated in S435 and S438 in the storage 215 (e.g., the nonvolatile storage 230).

In a S450 following S440, the processor 210 determines whether all the pixel lines have been processed. When there is one or more unprocessed pixel lines (S450: No), the processor 210 proceeds to S410 and processes a new target pixel line. When all the pixel lines is processed (S450: Yes), in S460, the processor 210 generates print data. In the present embodiment, the processor 210 generates the print data by converting an arrangement order of the group selection data and the gradation data for the selection data SIN indicated by a plurality of pieces of the line print data into an order in which the pieces of data are output to the print execution engine 400 and by adding a printer control code. Then, the processor 210 ends the process of FIG. 17, that is, the process in S180e of FIG. 16.

In the subsequent S190e, the processor 210 outputs the print data to the print execution engine 400 (FIG. 3C). In S195e, the second controller 490 of the print execution engine 400 controls the print execution engine 400 using the print data to print an image.

The output circuit 494a generates the waveform signal FIRE for each pixel line by referring to the group selection data included in the print data. In the present embodiment, the waveform data FIRE includes four pieces of drive waveform data of the first drive signal group, identification information of the nozzles NZ associated with the first drive signal group (i.e., identification information of the nozzles NZ that record dots in the overlapping range), four pieces of drive waveform data of the second drive signal group, identification information of the nozzles NZ associated with the second drive signal group (i.e., identification information of the nozzles NZ that record dots in the non-overlapping range). The output circuit 494a generates the selection data SIN by referring to the gradation data for the selection data SIN included in the print data. Then, the output circuit 494a outputs the data FIRE and the data SIN to the transfer circuit 494b every recording cycle T. The transfer circuit 494b transfers the data FIRE and the data SIN received from the output circuit 494a to the head driver 414. The head driver 414 supplies drive signals of the first drive signal group or the second drive signal group to the individual electrodes 413c in accordance with the data FIRE and the data SIN from the transfer circuit 494b. The drive signals of the first drive signal group (FIG. 18C) are used for the printing of the overlapping range, and the drive signals of the second drive signal group are used for the printing of the non-overlapping range. As a result, in the present embodiment, the same print result as the print result of the embodiment illustrated in FIG. 8A can be generated.

In the present embodiment, the density of the image to be printed is controlled by the process of S180e in FIG. 16 (specifically, S433 in FIG. 17 or the group selection data generated in S438). For example, when S433 is executed, the actual size of the dot corresponding to "Middle" is larger than in a case where S438 is executed in place of S433. The dot data generated in S173e is an example of target image data which is a target of data processing (S180e to S190e) including a density control process (S433).

As described above, in the present embodiment, the processor 210 executes the print control process of causing the print execution engine 400 to print the print image using the target image data. The print control process includes S180e to S190e in FIG. 16.

In S180e, as shown in FIG. 17, the processor 210 executes different processes for the overlapping range and the non-overlapping range. The print control process of S180e to S190e performed on non-overlapping range data of the target image data corresponding to the non-overlapping range will be referred to as a non-overlapping range process. The non-overlapping range process does not include S433 (FIG. 17). The print control process of S180e to S190e performed on overlapping range data of the target image data corresponding to the overlapping range will be referred to as an overlapping range process. The overlapping range process includes S433. As described above, the overlapping range process is different from the non-overlapping range process. The processor 210 causes the print execution engine 400 to print the image in the non-overlapping range by executing the non-overlapping range process on the non-overlapping range data. The processor 210 causes the print execution engine 400 to print the image in the overlapping range by executing the overlapping range process different from the non-overlapping range process on the overlapping range data.

As described with reference to FIG. 17, the process of S433 increases the density of at least a portion of the image to be printed in the overlapping range (specifically, a portion represented by dots corresponding to "Middle"). As a result, the actual dot size when S433 is executed may become larger than the actual dot size when S433 is not executed. As described above, the overlapping range process (the processes of S180e to S190e including S433) additionally includes the density control process (S180e including S433) of increasing the density of at least a portion of the image to be printed, as compared with the non-overlapping range process (processes of S180e to S190e not including S433). Therefore, the likelihood that the image printed in the overlapping range becomes pale can be reduced.

Further, in the present embodiment, the print head 410 (FIGS. 3A to 3C) includes the actuators 413x configured to generate pressure for ejecting ink from the nozzles NZ. The actuator 413x is provided for each of the plurality of nozzles NZ. The head driver 414 includes a plurality of the drive circuits 414d electrically connected to a plurality of the actuators 413x, respectively. Specifically, the drive circuits 414d are connected to the actuators 414x via the signal lines 414s and the individual electrodes 413c, respectively. The plurality of drive circuits 414d output drive signals to the plurality of actuators 413x, respectively.

The density control process (S180e including S433) causes the head driver 414 to output a drive signal (medium-large signal WML) corresponding to an ink amount larger than an ink amount corresponding to a drive signal (medium signal WM) to be output when the non-overlapping range process (S180e to S190e not including S433) is executed on the overlapping range data in order to form at least one dot (specifically, a dot corresponding to "Medium") among the plurality of dots in the overlapping range. Therefore, the likelihood that the image printed in the overlapping range becomes pale can be reduced.

In the present embodiment, the processor 210 determines the group selection data for each of C,M,Y and K by the process illustrated in FIG. 18. Alternatively, the processor 210 may determine the group selection data of some inks (for example, C and M) by the process illustrated in FIG. 18, and may determine the group selection data of the remaining inks (for example, Y and K) as data indicating the second drive signal group regardless of the position of the pixel line.

I. Variation (1) The printing process is not limited to the processes of the above-described embodiments, and may be various processes for increasing the density of at least a portion of the image to be printed in the overlapping range. For example, the change rate CR of FIG. 9B may be applied to the embodiment of FIG. 7 or FIG. 10A. For a pixel line having a high change rate CR (e.g., 90% or more) among the plurality of pixel lines included in the overlapping range, the process for increasing density may be omitted. Like the tone curve TLx of FIG. 15, the tone curves T1a to TLf of FIG. 14A may convert the output color value Vout into a value smaller than the input color value Vin when the input color value Vin is larger than the second threshold value V2. Each of the tone curves TL, T1a to TLf and TLx (FIGS. 13, 14A and 15) described above is configured such that the output color value Vout increases when the input color value Vin increases. However, the output color value Vout may be constant in a particular range of the input color value Vin. In general, when the input color value Vin is increased, it is preferable that the output color value Vout is not decreased but is kept constant or increased. The target image data may be generated by an external device (e.g., a personal computer) connected to the first controller 299. In this case, the first controller 299 may obtain the target image data from the external device.

(2) The configuration of the print execution engine may have various other configurations in place of the configuration illustrated in FIGS. 1, 2 and 3A to 3C. For example, the number of types of ink available may be any number of equal to or more than one (e.g., three types, namely, C,M, and Y; one type, namely, black K only; and the like). The total number of dot sizes available may be any number of equal to or more than two, including a dot size of Zero (no dot) and one or more dot sizes greater than Zero (e.g., two sizes, namely, no dot (Zero) and with dot; three sizes, namely, Zero, Medium, and Large; and the like). When changing the dot sizes of the overlapping range in the manner illustrated in FIG. 7, it is preferable that the total number of dot sizes available is three or more.

The print execution engine may be a so-called line printer. A print head of the line printer includes a plurality of nozzles corresponding to a plurality of pixels in a print target range of one partial print (e.g., the first print target range R1 in FIG. 4). The print head of the line printer forms all dots of one band image by ejecting ink droplets from of the plurality of nozzles (the process corresponds to partial printing). The line printer does not include a reciprocator for moving the head (for example, the reciprocator 430 (FIG. 2)). Such line printer prints an image by executing the partial printing for forming dots with the head a plurality of times in a state in which the paper PM is conveyed by a conveyer (for example, the conveyer 440). The dots in the overlapping range are formed by nozzles near edges of the head in the conveying direction. When actual sizes of dots formed by these nozzles becomes smaller than actual sizes of dots in the non-overlapping range, it is preferable to increase the density of at least a portion of the image to be printed in the overlapping range.

In the above-described embodiments, paper is used as a print medium. However, the print medium is not limited to paper, and may be various media such as cloth and film. The ink may be a pigment ink, a dye ink, an ultraviolet curable ink such as a UV ink, an ink containing an organic solvent such as a solvent ink, or an ink containing metal.

In either case, it is preferable that the printing process increases the density of at least a portion of the image to be printed in the overlap range with respect to one or more inks. The target ink of the process for increasing the density of the overlapping range may be arbitrarily selected from one or more available inks. For example, the printing process may increase the density of at least a portion of the image to be printed in the overlap range for all available inks.

(3) The multifunction peripheral 200 including the first controller 299 and the print execution engine 400 in the above-described embodiments is an example of a printer according to aspects of the present disclosure. In place of the configuration of the multifunction peripheral 200 illustrated in FIG. 1, the printer may have an arbitrary configuration which includes a print execution engine and a controller of the print execution engine. For example, the printer may be a single-function printer without the scanner 280.

The first controller 299 including the processor 210 in the above-described embodiments is an example of a controller according to aspects of the present disclosure configured to control the print execution engine 400. The first controller 299 is housed in the same housing (not shown) as the print execution engine 400. Alternatively, an external terminal device (e.g., a personal computer) connected to the print execution engine may control the print execution engine. For example, a printer driver installed in a terminal device including a computer may execute the printing process. The terminal device generates print data by executing the printing process, and outputs the generated print data to the print execution engine (e.g., the print execution engine 400). The print execution engine prints an image according to the print data. A plurality of devices (e.g., computers) that can communicate with each other via a network may share functions of the control process for printing and, as a whole, may provide the functions for the control process (a system including these devices corresponds to the controller).

In the above-described embodiments, a part of the configuration realized by hardware may be replaced with software, and conversely, a part of or all the configuration realized by software may be replaced with hardware. For example, the function of executing the S173 halftone in S173 of FIG. 6 may be realized by a dedicated hardware circuit.

When some or all of the functions of the present disclosure are realized by a computer program, the program can be provided in a form stored in a computer-readable storage medium (e.g., a non-transitory storage medium). The program may be used in a state being stored in a storage medium (computer-readable storage medium) that is the same as or different from that at the time of provision. The "computer-readable storage medium" is not limited to a portable storage medium such as a memory card or a CD-ROM, and may include an internal storage in a computer such as various ROMs and an external storage connected to a computer such as a hard disk drive.

Although the present disclosure has been described based on the embodiments and variations, the embodiments of the present disclosure described above are intended to facilitate understanding of the present disclosure, and thus are not intended to limit the present disclosure. The present disclosure may be modified and improved without departing from the concept thereof, and the present disclosure includes equivalents thereof.

What is claimed is:

1. A controller configured to control a print execution engine including a print head having a plurality of nozzles configured to eject ink, a head driver configured to cause the print head to eject ink to form dots on a print medium, and a conveyer configured to convey the print medium with respect to the print head in a conveying direction, the controller comprising:
   a print controller configured to cause the print execution engine to print a print image by causing the print execution engine to, using target image data, convey the print medium with the conveyer and execute a plurality of partial printings in which the print head forms the dots,
   wherein the print controller is configured to:
      cause the print execution engine to execute a first partial printing; and
      cause the print execution engine to execute a second partial printing,
   wherein, on the print medium, defined are a first target range and a second target range, the first target range being a print target range in the conveying direction on which printing is to be performed by the first partial printing and the second target range being a print target range in the conveying direction on which printing is to be performed by the second partial printing, the first and second target ranges forming an overlapping range in which edge portions of the first target range and the second target range overlap each other, wherein the first target range includes a first non-overlapping range that does not overlap the second target range,
   wherein the second target range includes a second non-overlapping range that does not overlap the first target range,
   wherein the print controller is configured to execute generating print data based on pieces of non-overlapping range data of the target image data corresponding to the first and second non-overlapping ranges and on overlapping range data of the target image data corresponding to the overlapping range, and outputting the print data to cause the print execution engine to print images in the first and second non-overlapping ranges and the overlapping range,
   wherein the generating the print data includes increasing a density of the image of the overlapping range as compared with a density of the entire image of the first non-overlapping range and as compared with a density of the entire image of the second non-overlapping range.

2. The controller according to claim 1,
   wherein the generating the print data includes generating pieces of non-overlapping range dot data indicating the images within the first and second non-overlapping ranges using the pieces of non-overlapping range data, the non-overlapping range dot data being dot data indicating a size of the dot for each pixel, and generating overlapping range dot data indicating the image within the overlapping range using the overlapping range data, the overlapping range dot data being the dot data,
   wherein the generating the pieces of non-overlapping range dot data includes:
      selecting the size of the dot from a non-overlapping range dot size set consisting of a plurality of sizes including a zeroth size corresponding to an ink amount of zero and a first size corresponding to an ink amount larger than 0, and as the increasing the density of at least a portion of the image to be printed in the overlapping range, selecting the size of the dot from an overlapping range dot size set consisting of a plurality of sizes including the zeroth size and an alternative size, the alternative size being an alternative to the first size and being a size corresponding to an ink amount larger than an ink amount corresponding to the first size.

3. The controller according to claim 2, wherein:

the non-overlapping range dot size set includes the zeroth size, the first size, and a second size being a size corresponding to an ink amount larger than the ink amount corresponding to the first size, and the alternative size corresponds to an ink amount between the ink amount of the first size and the ink amount of the second size.

4. The controller according to claim 1, wherein the increasing the density of at least a portion of the image to be printed in the overlapping range includes:

increasing a density of a first portion of the image in the overlapping range to be printed by the first partial printing toward an edge of the first target range on a second target range side; and increasing a density of a second portion of the image in the overlapping range to be printed by the second partial printing toward an edge of the second target range on a first target range side.

5. The controller according to claim 1, wherein:

the plurality of nozzles includes nozzles for ejecting a first ink and nozzles for ejecting a second ink, and the increasing the density of at least a portion of the image to be printed in the overlapping range increases the density of, among the image to be printed in the overlapping range, at least a portion of a partial image indicated by dots of the second ink without changing the density of a partial image indicated by dots of the first ink.

6. The controller according to claim 1, wherein:

the print head includes a plurality of actuators configured to generate pressure for ejecting the ink from the nozzles, the plurality of actuators being provided to the plurality of nozzles, respectively, and the head driver includes a drive circuit electrically connected to the plurality of actuators and configured to output a drive signal to each of the plurality of actuators, and the increasing the density of at least a portion of the image to be printed in the overlapping range causes the head driver to output a drive signal corresponding to a larger ink amount than in a case where the increasing the density of at least a portion of the image to be printed in the overlapping range is not executed in order to form at least one of the dots within the overlapping range.

7. The controller according to claim 1, wherein the print controller is further configured to:

cause the print execution engine to execute the first partial printing;

cause the print execution engine to convey the print medium after the first partial printing; and cause the print execution engine to execute the second partial printing after conveying the print medium.

8. A printer comprising:

a print execution engine including a print head having a plurality of nozzles for ejecting ink, a head driver configured to cause the print head to eject ink to form dots on a print medium, and a conveyer configured to convey the print medium with respect to the print head in a conveying direction; and a controller configured to control the print execution engine, the controller including a print controller configured to cause the print execution engine to print a print image by causing the print execution engine to, using target image data, convey the print medium with the conveyer and execute a plurality of partial printings in which the print head forms the dots, wherein the print controller is configured to:

cause the print execution engine to execute a first partial printing; and cause the print execution engine to execute a second partial printing, wherein, on the print medium, defined are a first target range and a second target range, the first target range being a print target range in the conveying direction on which printing is to be performed by the first partial printing and the second target range being a print target range in the conveying direction on which printing is to be performed by the second partial printing, the first and second target ranges forming an overlapping range in which edge portions of the first target range and the second target range overlap each other, wherein the first target range includes a first non-overlapping range that does not overlap the second target range, wherein the second target range includes a second non-overlapping range that does not overlap the first target range, wherein the print controller is configured to execute generating print data based on pieces of non-overlapping range data of the target image data corresponding to the first and second non-overlapping ranges and on overlapping range data of the target image data corresponding to the overlapping range, and output the print data to cause the print execution engine to print images in the first and second non-overlapping ranges and an image in the overlapping range, wherein the generating the print data includes increasing a density of the image of the overlapping range as compared with a density of the entire image of the first non-overlapping range and as compared with a density of the entire image of the second non-overlapping range.

9. A non-transitory computer-readable storage medium storing computer-readable instructions configured to, when executed by a controller configured to control a print execution engine including a print head having a plurality of nozzles configured to eject ink, a head driver configured to cause the print head to eject ink to form dots on a print medium, and a conveyer configured to convey the print medium with respect to the print head in a conveying direction, the controller comprising a print controller configured to cause the print execution engine to print a print image by causing the print execution engine to, using target image data, convey the print medium with the conveyer and execute a plurality of partial printings in which the print head forms the dots, cause the print controller to:

cause the print execution engine to execute a first partial printing; and cause the print execution engine to execute a second partial printing, wherein, on the print medium, defined are a first target range and a second target range, the first target range being a print target range in the conveying direction on which printing is to be performed by the first partial printing and the second target range being a print target range in the conveying direction on which printing is to be performed by the second partial printing, the first and second target ranges forming an overlapping range in which edge portions of the first target range and the second target range overlap each other, wherein the first target range includes a first non-overlapping range that does not overlap the second target range, wherein the second target range includes a second non-overlapping range that does not overlap the first target range, wherein the print controller is caused to execute generating print data based on pieces of non-overlapping range data of the target image data corresponding to the first and second non-overlapping ranges and on overlapping range data of the target image data corresponding to the overlapping range, and output the print data to cause the print execution engine to print images in the first and second non-overlapping ranges and an image in the overlapping range, wherein the generating the print data includes increasing a density of the image of the overlapping range as compared with a density of the entire image of the first non-overlapping range and as compared with a density of the entire image of the second non-overlapping range.

\* \* \* \* \*